(12) United States Patent
Southwell et al.

(10) Patent No.: US 12,380,873 B2
(45) Date of Patent: Aug. 5, 2025

(54) ECHO REFERENCE PRIORITIZATION AND SELECTION

(71) Applicant: Dolby Laboratories Licensing Corporation, San Francisco, CA (US)

(72) Inventors: Benjamin John Southwell, Gledwood Hills (AU); Christopher Graham Hines, Sydney (AU); David Gunawan, Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 16 days.

(21) Appl. No.: 18/263,956

(22) PCT Filed: Feb. 7, 2022

(86) PCT No.: PCT/US2022/015529
§ 371 (c)(1),
(2) Date: Aug. 2, 2023

(87) PCT Pub. No.: WO2022/173706
PCT Pub. Date: Aug. 18, 2022

(65) Prior Publication Data
US 2024/0304171 A1 Sep. 12, 2024

Related U.S. Application Data

(60) Provisional application No. 63/201,939, filed on May 19, 2021, provisional application No. 63/147,573, filed on Feb. 9, 2021.

(30) Foreign Application Priority Data

Jun. 2, 2021 (EP) ..................... 21177382

(51) Int. Cl.
*G10K 11/178* (2006.01)

(52) U.S. Cl.
CPC .. *G10K 11/17823* (2018.01); *G10K 11/17873* (2018.01); *G10K 2210/30231* (2013.01);
(Continued)

(58) Field of Classification Search
CPC ....... G10K 11/17823; G10K 11/17873; G10K 2210/30231; G10K 2210/3027; G10K 2210/505
(Continued)

(56) References Cited

U.S. PATENT DOCUMENTS 8,855,295 B1 10/2014 Chhetri
9,589,575 B1 3/2017 Ayrapetian
(Continued)

FOREIGN PATENT DOCUMENTS

| WO | 2016033364 A1 | 3/2016 |
| WO | 2018226359 A1 | 12/2018 |
| WO | 2021021707 A1 | 2/2021 |

*Primary Examiner* — Vivian C Chin
*Assistant Examiner* — Douglas J Suthers

(57) ABSTRACT

Some implementations involve obtaining a plurality of echo references, the plurality of echo references including at least one echo reference for each audio device of a plurality of audio devices in an audio environment, each echo reference corresponding to audio data being played back by one or more loudspeakers of one audio device of the plurality of audio devices. Some examples involve making an importance estimation for each echo reference of the plurality of echo references. Making the importance estimation may involve determining an expected contribution of each echo reference to mitigation of echo by at least one echo management system of at least one audio device of the audio environment. Some implementations involve selecting, based at least in part on the importance estimation, one or
(Continued)

more selected echo references and providing the one or more selected echo references to the at least one echo management system.

20 Claims, 12 Drawing Sheets

(52) U.S. Cl.
CPC ............... *G10K 2210/3027* (2013.01); *G10K 2210/505* (2013.01)

(58) Field of Classification Search
USPC .......................................................... 381/66
See application file for complete search history.

(56) References Cited

U.S. PATENT DOCUMENTS

| 9,659,555 | B1 * | 5/2017 | Hilmes | H04R 3/005 |
|---|---|---|---|---|
| 2010/0272251 | A1 | 10/2010 | Banba | |
| 2014/0003611 | A1 | 1/2014 | Mohammad | |
| 2015/0112672 | A1 | 4/2015 | Giacobello | |
| 2016/0029120 | A1 | 1/2016 | Nesta | |
| 2016/0309275 | A1 | 10/2016 | Schevciw | |
| 2019/0103088 | A1 | 4/2019 | Zheng | |
| 2019/0115040 | A1 | 4/2019 | Kamdar | |
| 2019/0165832 | A1 | 5/2019 | Khanduri | |
| 2019/0272843 | A1 | 9/2019 | Thorpe | |

* cited by examiner

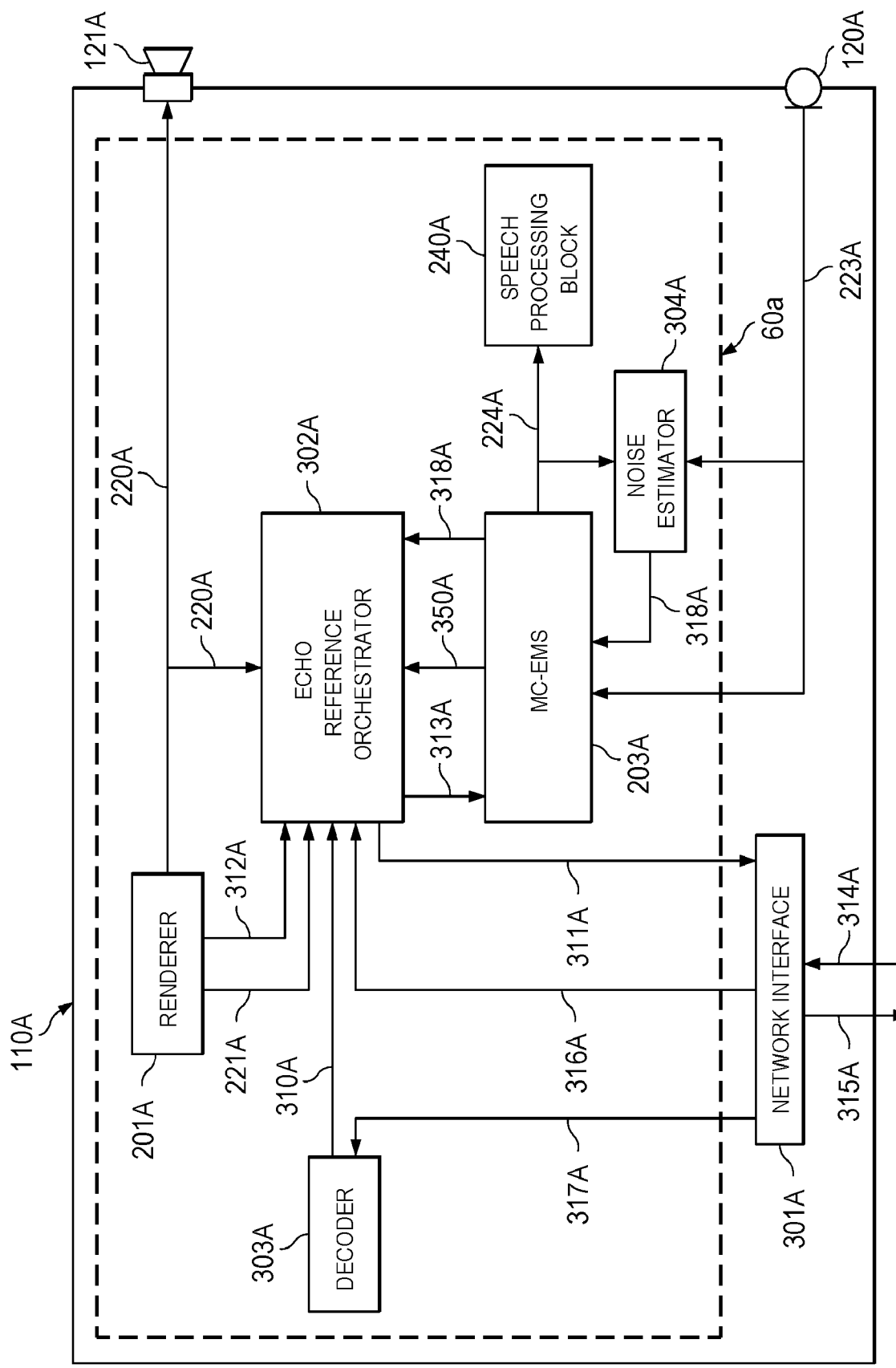

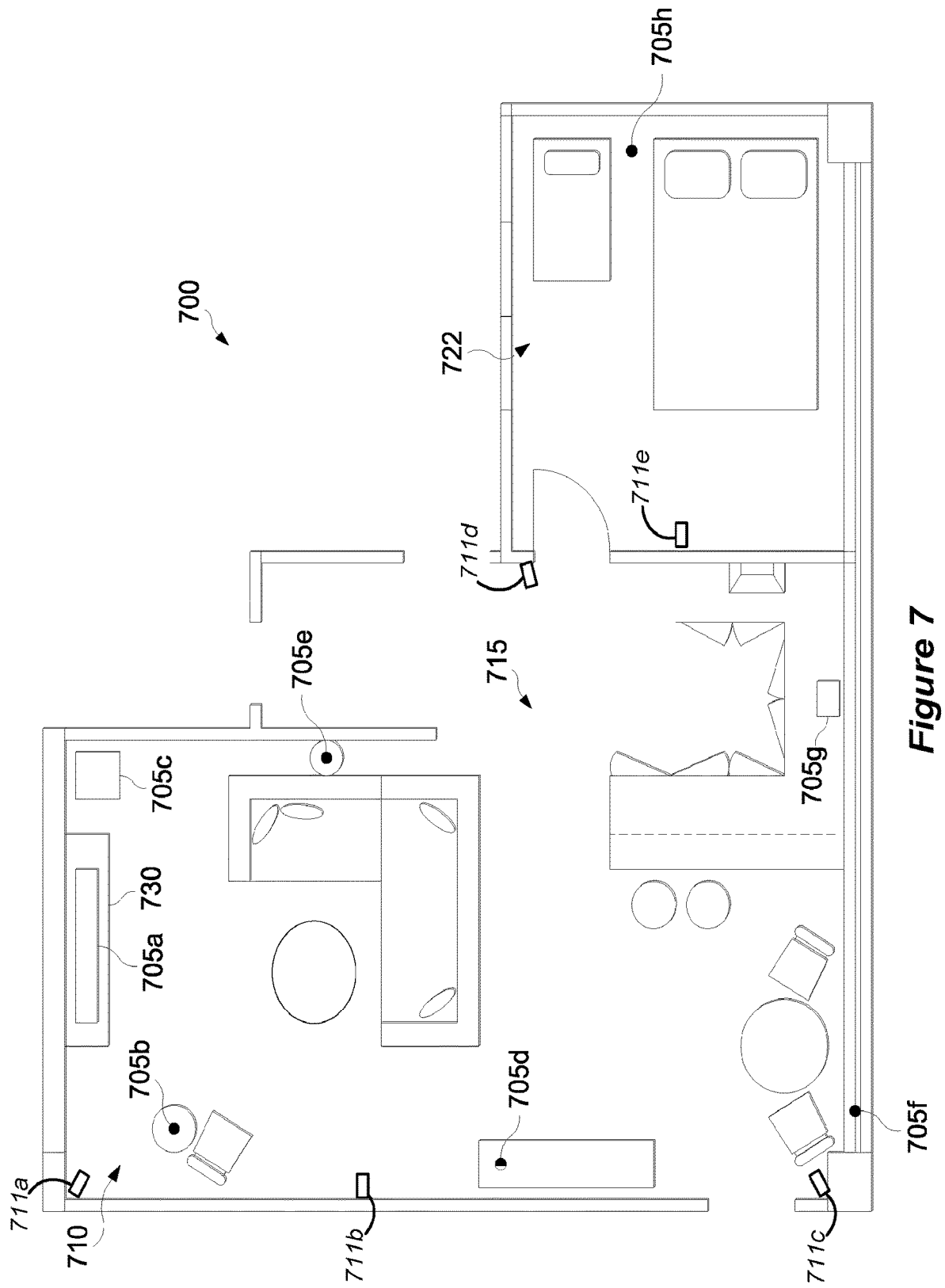

ECHO REFERENCE PRIORITIZATION AND SELECTION

CROSS REFERENCE TO RELATED APPLICATIONS

This application is a U.S. National Stage application under U.S.C. 371 of International Application No. PCT/US2022/015529, filed on Feb. 7, 2022, which claims priority to U.S. Provisional Application No. 63/147,573, filed Feb. 9, 2021, U.S. Provisional Application No. 63/201,939, filed May 19, 2021, and EP Application Serial No. 21177382.5, filed Jun. 2, 2021, all of which are incorporated herein by reference in their entirety.

TECHNICAL FIELD

This disclosure pertains to devices, systems and methods for implementing acoustic echo management.

BACKGROUND

Audio devices having acoustic echo management systems are widely deployed. An acoustic echo management system may include an acoustic echo canceller and/or an acoustic echo suppressor. Although existing devices, systems and methods for acoustic echo management provide benefits, improved devices, systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X−M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via one or more audio processing methods. The audio processing method manages echo in an audio system. The audio system comprises a plurality of audio devices in an audio environment. Each device of the plurality of audio devices comprises one or more loudspeakers. In some instances, the method(s) may be implemented, at least in part, by a control system and/or via instructions (e.g., software) stored on one or more non-transitory media of a first device of the plurality of audio devices of the audio system. The first device may comprise one or more microphones. Some such methods involve obtaining, by the control system of the first device, a plurality of echo references. The plurality of echo references may include at least one echo reference for each audio device of the plurality of audio devices in the audio environment. Each echo reference may correspond to audio data being played back by the one or more loudspeakers of the corresponding audio device of the plurality of audio devices. The plurality of echo references includes at least one echo reference of the first audio device.

The method may involve making, by the control system, an importance estimation for each echo reference of the plurality of echo references. In some examples, making the importance estimation may involve determining an expected contribution of each echo reference to mitigation of echo by at least one echo management system of at least one audio device of the audio environment. The echo management system(s) may, for example, include an acoustic echo canceller (AEC) and/or an acoustic echo suppressor (AES).

The method may involve selecting, by the control system and based at least in part on the importance estimation, one or more echo references from the plurality of echo references. The selected echo references may be a subset of one or more echo references of the (whole) plurality of echo references. The method may involve providing, by the control system, the one or more selected echo references to the at least one echo management system. In some examples, the method may involve causing the at least one echo management system to cancel or suppress echoes based, at least in part, on the one or more selected echo references.

According to some examples, the audio devices of the audio system may communicatively be coupled via a wired or wireless communication network. The plurality of echo references, e.g. non-local echo references of other audio devices different from the first audio device and/or the echo reference of the first audio device, may be obtained via the wired or wireless communication network.

According to some examples, obtaining the plurality of echo references may involve receiving a content stream that includes audio data and determining one or more echo references of the plurality of echo references based on the audio data.

In some implementations, the control system may be, or may include, an audio device control system of an audio device in the audio environment. In some such implementations, the method may involve rendering, by the audio device control system, the audio data for reproduction on the audio device to produce local speaker feed signals. In some such implementations, the method may involve determining a local echo reference that corresponds with the local speaker feed signals.

In some examples, obtaining the plurality of echo references may involve determining one or more non-local echo references based on the audio data. In some such examples, each of the non-local echo references may correspond to non-local speaker feed signals for playback on another audio device of the audio environment.

According to some examples, obtaining the plurality of echo references may involve receiving one or more non-local echo references. In some such examples, each of the non-local echo references may correspond to non-local speaker feed signals for playback on another audio device of the audio environment. In some examples, receiving the one or more non-local echo references may involve receiving the one or more non-local echo references from one or more other audio devices of the audio environment. In some examples, receiving the one or more non-local echo references may involve receiving each of the one or more non-local echo references from a single other device of the audio environment.

In some examples, the method may involve a cost determination. According to some examples, the cost determination may involve determining a cost for at least one echo reference of the plurality of echo references. In some examples, selecting the one or more selected echo references may be based, at least in part, on the cost determination.

According to some examples, the cost determination may be based on the network bandwidth required for transmitting the at least one echo reference, an encoding computational requirement for encoding the at least one echo reference, a decoding computational requirement for decoding the at least one echo reference, an echo management system computational requirement for use of the at least one echo reference by the echo management system, or one or more combinations thereof.

In some examples, the cost determination may be based on a replica of the at least one echo reference in a time domain or a frequency domain, on a downsampled version of the at least one echo reference, on a lossy compression of the at least one echo reference, on banded power information for the at least one echo reference, or one or more combinations thereof. According to some examples, the cost determination may be based on a method of compressing a relatively more important echo reference less than a relatively less important echo reference.

In some examples, the method may involve determining a current echo management system performance level. According to some examples, selecting the one or more selected echo references may be based, at least in part, on the current echo management system performance level.

According to some examples, making the importance estimation may involve determining an importance metric for a corresponding echo reference. In some such examples, determining the importance metric may involve determining a level of the corresponding echo reference, determining a uniqueness of the corresponding echo reference, determining a temporal persistence of the corresponding echo reference, determining an audibility of the corresponding echo reference, or one or more combinations thereof.

In some instances, determining the importance metric may be based at least in part on data or metadata corresponding to an audio device layout, loudspeaker metadata, metadata corresponding to received audio data, an upmixing matrix, a matrix of loudspeaker activations, or one or more combinations thereof.

According to some examples, determining the importance metric may be based at least in part on a current listening objective, a current ambient noise estimate, an estimate of a current performance of the at least one echo management system, or one or more combinations thereof.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via apparatus. For example, one or more devices may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

FIG. 3A presents a block diagram that shows components of an audio device according to one example.

FIG. 7 shows an example of a floor plan of an audio environment, which is a living space in this example.

DETAILED DESCRIPTION OF EMBODIMENTS

Figure 1A:
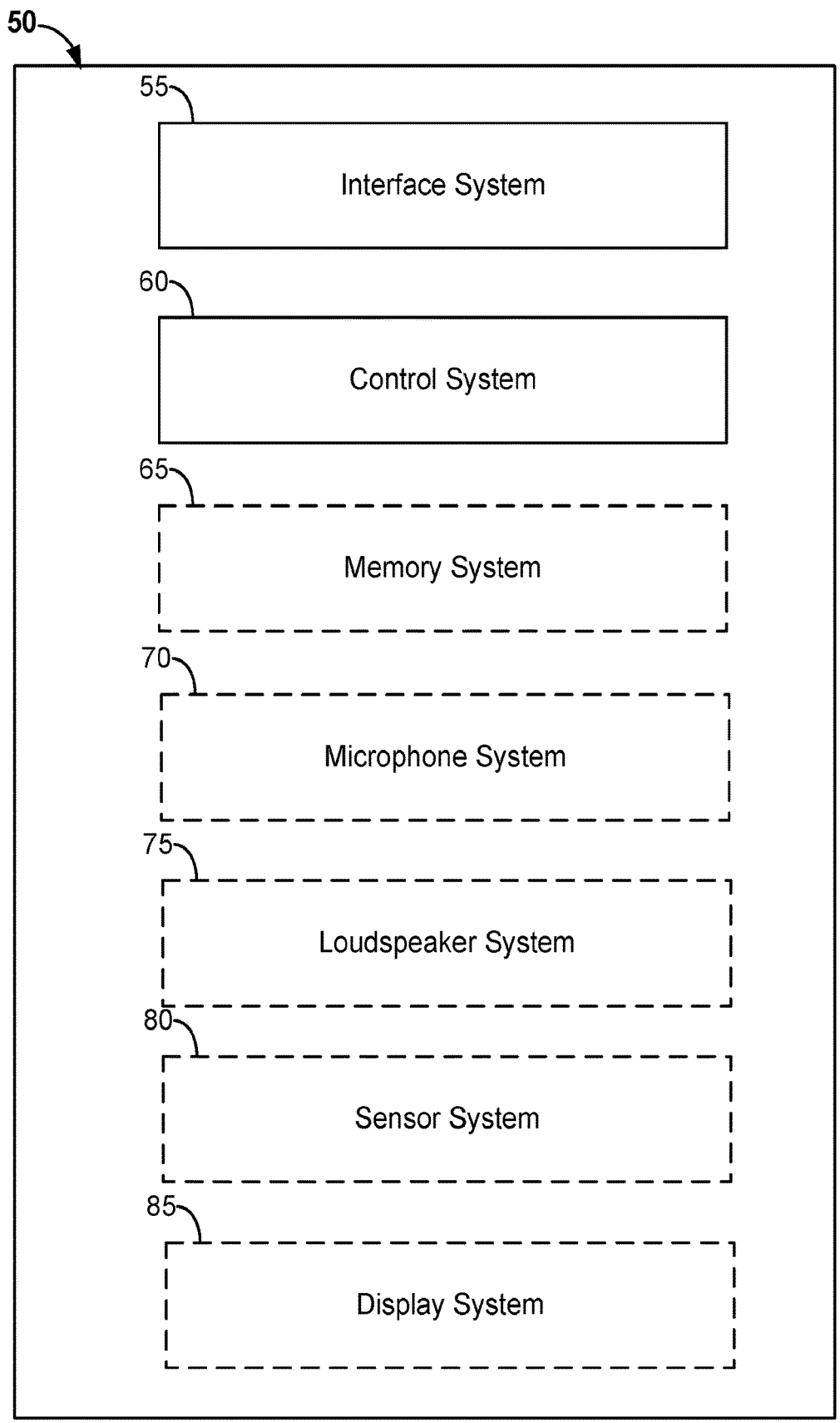
FIG. 1A is a block diagram that shows examples of components of an apparatus capable of implementing various aspects of this disclosure.

FIG. 1A is a block diagram that shows examples of components of an apparatus capable of implementing various aspects of this disclosure. As with other figures provided herein, the types and numbers of elements shown in FIG. 1A are merely provided by way of example. Other implementations may include more, fewer and/or different types and numbers of elements. According to some examples, the apparatus 50 may be configured for performing at least some of the methods disclosed herein. In some implementations, the apparatus 50 may be, or may include, one or more components of an audio system. For example, the apparatus 50 may be an audio device, such as a smart audio device, in some implementations. In other examples, the examples, the apparatus 50 may be a mobile device (such as a cellular telephone), a laptop computer, a tablet device, a television or another type of device.

According to some alternative implementations the apparatus 50 may be, or may include, a server. In some such examples, the apparatus 50 may be, or may include, an encoder. Accordingly, in some instances the apparatus 50 may be a device that is configured for use within an audio environment, such as a home audio environment, whereas in other instances the apparatus 50 may be a device that is configured for use in "the cloud," e.g., a server.

In this example, the apparatus 50 includes an interface system 55 and a control system 60. The interface system 55 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 55 may, in some implementations, be configured for exchanging control information and associated data with audio devices of the audio environment. The control information and associated data may, in some examples, pertain to one or more software applications that the apparatus 50 is executing.

The interface system 55 may, in some implementations, be configured for receiving, or for providing, a content stream. The content stream may include audio data. The audio data may include, but may not be limited to, audio signals. In some instances, the audio data may include spatial data, such as channel data and/or spatial metadata. Metadata may, for example, have been provided by what may be referred to herein as an "encoder." In some examples, the content stream may include video data and audio data corresponding to the video data.

The interface system 55 may include one or more network interfaces and/or one or more external device interfaces (such as one or more universal serial bus (USB) interfaces). According to some implementations, the interface system 55 may include one or more wireless interfaces. The interface system 55 may include one or more devices for implementing a user interface, such as one or more microphones, one or more speakers, a display system, a touch sensor system and/or a gesture sensor system. In some examples, the interface system 55 may include one or more interfaces between the control system 60 and a memory system, such as the optional memory system 65 shown in FIG. 1A. However, the control system 60 may include a memory system in some instances. The interface system 55 may, in some implementations, be configured for receiving input from one or more microphones in an environment.

The control system 60 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 60 may reside in more than one device. For example, in some implementations a portion of the control system 60 may reside in a device within one of the environments depicted herein and another portion of the control system 60 may reside in a device that is outside the environment, such as a server, a mobile device (e.g., a smartphone or a tablet computer), etc. In other examples, a portion of the control system 60 may reside in a device within one of the environments depicted herein and another portion of the control system 60 may reside in one or more other devices of the environment. For example, control system functionality may be distributed across multiple smart audio devices of an environment, or may be shared by an orchestrating device (such as what may be referred to herein as a smart home hub) and one or more other devices of the environment. In other examples, a portion of the control system 60 may reside in a device that is implementing a cloud-based service, such as a server, and another portion of the control system 60 may reside in another device that is implementing the cloud-based service, such as another server, a memory device, etc. The interface system 55 also may, in some examples, reside in more than one device.

In some implementations, the control system 60 may be configured for performing, at least in part, the methods disclosed herein. According to some examples, the control system 60 may be configured to obtain a plurality of echo references. The plurality of echo references may include at least one echo reference for each audio device of a plurality of audio devices in an audio environment. Each echo reference may, for example, correspond to audio data being played back by one or more loudspeakers of one audio device of the plurality of audio devices.

In some implementations, the control system 60 may be configured to make an importance estimation for each echo reference of the plurality of echo references. In some examples, making the importance estimation may involve determining an expected contribution of each echo reference to mitigation of echo by at least one echo management system of at least one audio device of the audio environment. The echo management system(s) may include an acoustic echo canceller (AEC) and/or an acoustic echo suppressor (AES).

According to some examples, the control system 60 may be configured to select based at least in part on the importance estimation, one or more selected echo references. In some examples, the control system 60 may be configured to provide the one or more selected echo references to the at least one echo management system.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 65 shown in FIG. 1A and/or in the control system 60. Accordingly, various innovative aspects of the subject matter described in this disclosure can be implemented in one or more non-transitory media having software stored thereon. The software may, for example, include instructions for controlling at least one device to perform some or all of the methods disclosed herein. The software may, for example, be executable by one or more components of a control system such as the control system 60 of FIG. 1A.

In some examples, the apparatus 50 may include the optional microphone system 70 shown in FIG. 1A. The optional microphone system 70 may include one or more microphones. According to some examples, the optional microphone system 70 may include an array of microphones. In some examples, the array of microphones may be configured to determine direction of arrival (DOA) and/or time of arrival (TOA) information, e.g., according to instructions from the control system 60. The array of microphones may, in some instances, be configured for receive-side beamforming, e.g., according to instructions from the control system 60. In some implementations, one or more of the microphones may be part of, or associated with, another device, such as a speaker of the speaker system, a smart audio device, etc. In some examples, the apparatus 50 may not include a microphone system 70. However, in some such implementations the apparatus 50 may nonetheless be configured to receive microphone data for one or more microphones in an audio environment via the interface system 60. In some such implementations, a cloud-based implementation of the apparatus 50 may be configured to receive microphone data, or data corresponding to the microphone data, from one or more microphones in an audio environment via the interface system 60.

According to some implementations, the apparatus 50 may include the optional loudspeaker system 75 shown in FIG. 1A. The optional loudspeaker system 75 may include one or more loudspeakers, which also may be referred to herein as "speakers" or, more generally, as "audio reproduction transducers." In some examples (e.g., cloud-based implementations), the apparatus 50 may not include a loudspeaker system 75.

In some implementations, the apparatus 50 may include the optional sensor system 80 shown in FIG. 1A. The optional sensor system 80 may include one or more touch sensors, gesture sensors, motion detectors, etc. According to some implementations, the optional sensor system 80 may include one or more cameras. In some implementations, the cameras may be free-standing cameras. In some examples, one or more cameras of the optional sensor system 80 may reside in a smart audio device, which may be a single purpose audio device or a virtual assistant. In some such examples, one or more cameras of the optional sensor system 80 may reside in a television, a mobile phone or a smart speaker. In some examples, the apparatus 50 may not include a sensor system 80. However, in some such implementations the apparatus 50 may nonetheless be configured to receive sensor data for one or more sensors in an audio environment via the interface system 60.

In some implementations, the apparatus 50 may include the optional display system 85 shown in FIG. 1A. The optional display system 85 may include one or more displays, such as one or more light-emitting diode (LED) displays. In some instances, the optional display system 85 may include one or more organic light-emitting diode (OLED) displays. In some examples, the optional display system 85 may include one or more displays of a smart audio device. In other examples, the optional display system 85 may include a television display, a laptop display, a mobile device display, or another type of display. In some examples wherein the apparatus 50 includes the display system 85, the sensor system 80 may include a touch sensor system and/or a gesture sensor system proximate one or more displays of the display system 85. According to some such implementations, the control system 60 may be configured for controlling the display system 85 to present one or more graphical user interfaces (GUIs).

According to some such examples the apparatus 50 may be, or may include, a smart audio device. In some such implementations the apparatus 50 may be, or may include, a wakeword detector. For example, the apparatus 50 may be, or may include, a virtual assistant.

For playback media that is stereo or mono, traditionally it has been rendered into an audio environment (e.g., a living space, automobile, office space, etc.) via a pair of speakers physically wired to an audio player (e.g. a CD/DVD player, a television (TV), etc.). As smart speakers have become popular, users often have more than two audio devices configured for wireless communication (which may include, but are not limited to, smart speakers or other smart audio devices) in their homes (or other audio environments) that are capable of playing back audio.

Smart speakers are often configured to operate according to voice commands. Accordingly, such smart speakers are generally configured to listen continuously for a wakeword, which will normally be followed by a voice command. Any continuous listening task such as waiting for a wakeword, or performing any kind of "continuous calibration," will preferably continue to function during the playback of content (such as the playback of music, the playback of sound tracks for movies and television programs, etc.) and while device interactions take place (e.g., during telephone calls). Audio devices that need to listen during the playback of content will typically need to employ some form of echo management, e.g., echo cancellation and/or echo suppression, to remove the "echo" (content played by the devices) from microphone signals.

Figure 1B:
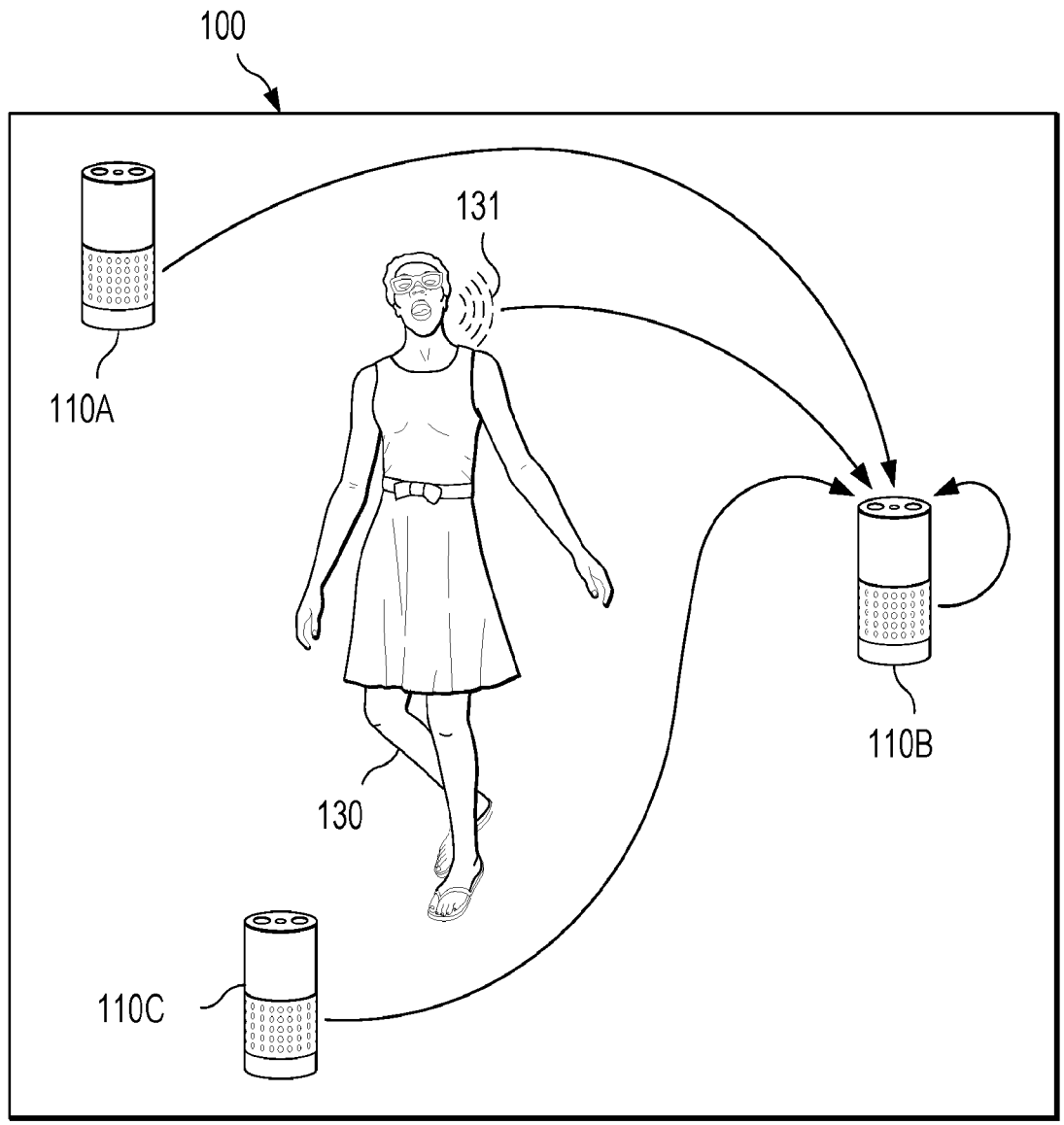
FIG. 1B shows an example of an audio environment.

FIG. 1B shows an example of an audio environment. As with other figures provided herein, the types, numbers and arrangement of elements shown in FIG. 1B are merely provided by way of example. Other implementations may include more, fewer and/or different types, numbers and/or arrangements of elements.

According to this example, the audio environment 100 includes audio devices 110A, 110B and 110C. In this example, each of the audio devices 110A-110C is an instance of the apparatus 50 of FIG. 1A and includes an instance of the microphone system 70 and the loudspeaker system 75, though these are not shown in FIG. 1B. According to some examples, each the audio devices 110A-110C may be a smart audio device, such as a smart speaker.

In this example, the audio devices 110A-110C are playing back audio content while a person 130 is talking. The microphones of audio device 110B detect not only the audio content played back by its own speaker, but also the speech sounds 131 of the person 130 and the audio content played back by the audio devices 110A and 110C.

In order to utilize as many speakers as possible at the same time, a typical approach is for all of the audio devices in an audio environment to play back the same content, with some timing mechanism to keep the playback media in synchronization. This has the advantage of making distribution simple, because all the devices receive the same copy of the playback media either downloaded or streamed to each audio device, or broadcast by one device and multicast to all the audio devices.

One major disadvantage of this approach is that no spatial effect is obtained. A spatial effect may be achieved by adding more playback channels (e.g., one per speaker), e.g., through upmixing. In some examples a spatial effect may be achieved via a flexible rendering process such as Center of Mass Amplitude Panning (CMAP), Flexible Virtualization (FV), or a combination of CMAP and FV. Relevant examples of CMAP, FV and combinations thereof are described in International Patent Publication No. WO 2021/021707 A1 (e.g., on pages 25-41), which is hereby incorporated by reference.

Figure 1C:
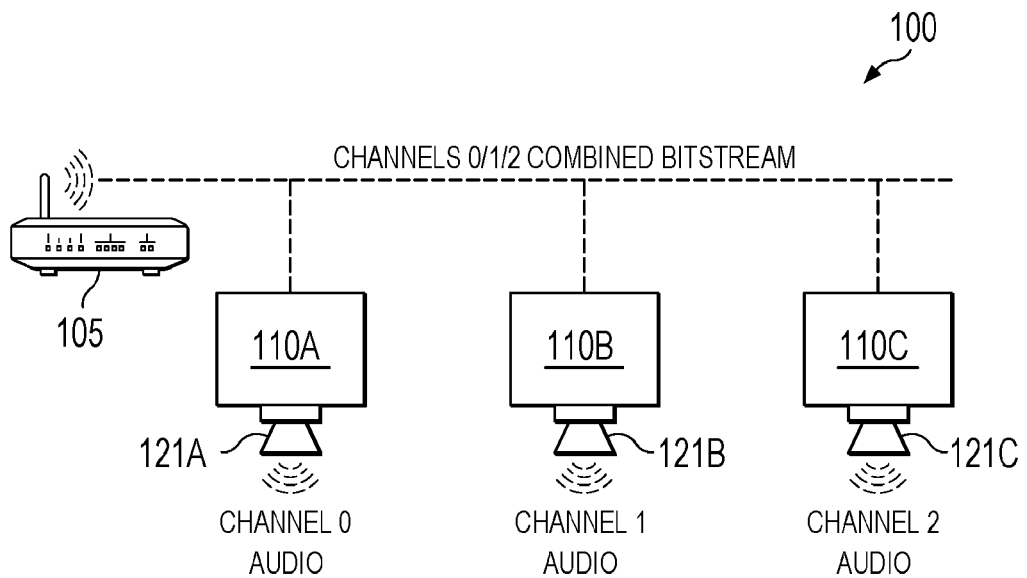
FIGS. 1C and 1D show examples of how playback channels may be received by the audio devices 110A-110C.
Figure 1D:
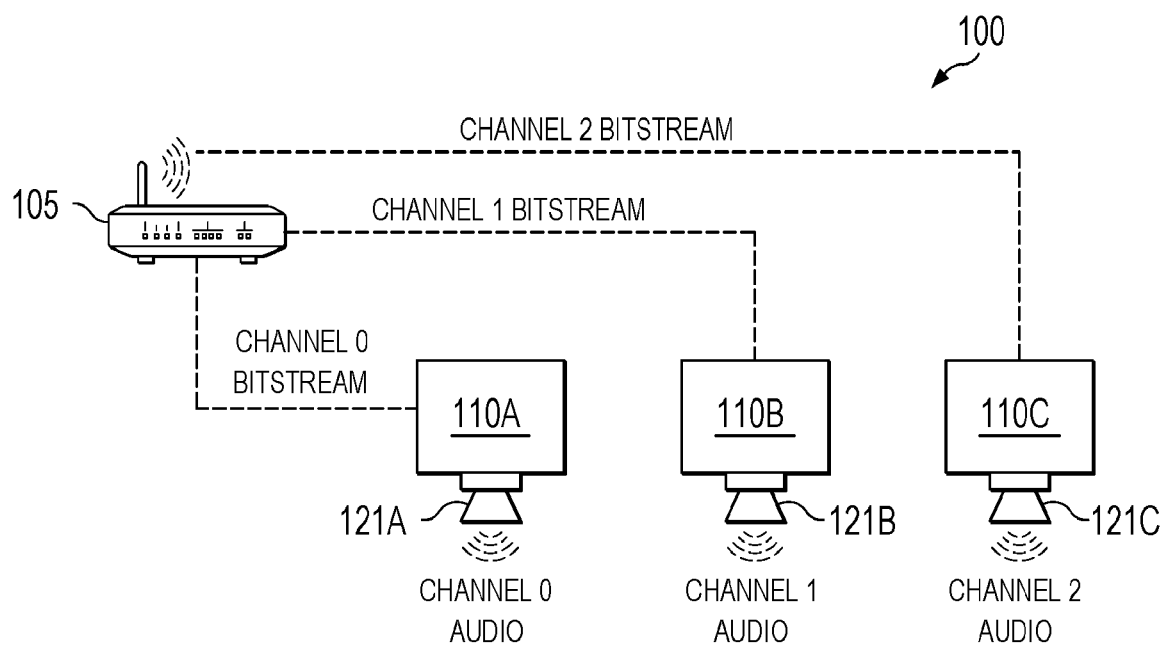

FIGS. 1C and 1D show additional examples of audio devices in an audio environment. According to these examples, the audio environments 100 include a smart home hub 105 and audio devices 110A, 110B and 110C. In these examples, the smart home hub 105 and the audio devices 110A-110C are instances of the apparatus 50 of FIG. 1A. According to these examples, each of the audio devices 110A-110C includes a corresponding one of the loudspeakers 121A, 121B and 121C. According to some examples, each the audio devices 110A-110C may be a smart audio device, such as a smart speaker.

FIGS. 1C and 1D show examples of how playback channels may be received by the audio devices 110A-110C. In FIG. 1C, an encoded audio bitstream is multicast to all of the audio devices 110A-110C. In FIG. 1D, each of the audio devices 110A-110C receives only the channel that the audio device needs for playback. The choice of bitstream distribution may vary according to the individual implementation and may, for example, be based on the available system bandwidth, the coding efficiency of the audio codec used, the capabilities of the audio devices 110A-110C and/or other factors. The exact topologies of the audio environments shown in FIGS. 1C and 1D are not important. However, these examples illustrate the fact that distributing audio channels to devices audio devices will incur some cost. The cost may be assessed in terms of the required network bandwidth, the added computational cost of encoding decoding the channels of audio, etc.

Figure 1E:
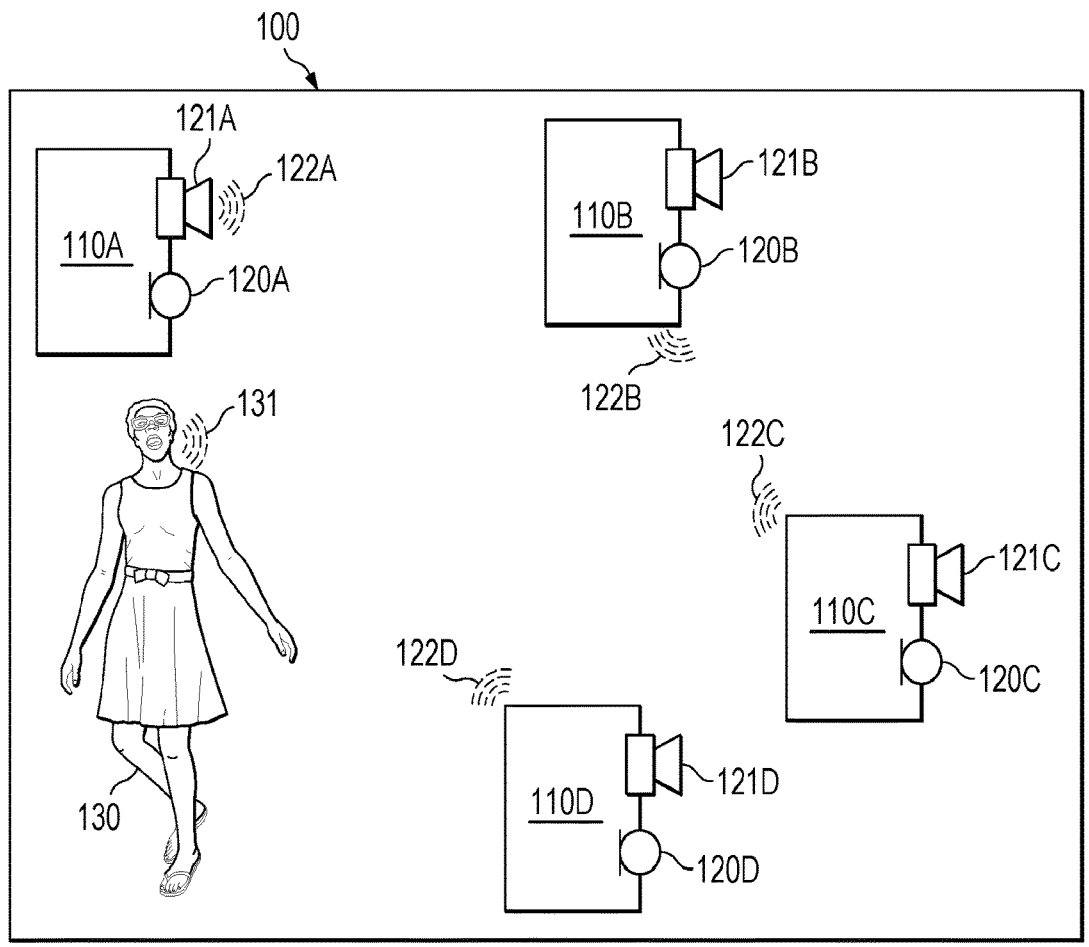
FIG. 1E shows another example of an audio environment.

FIG. 1E shows another example of an audio environment. According to this example, the audio environment 100 includes audio devices 110A, 110B, 110C and 110D. In this example, each of the audio devices 110A-110D is an instance of the apparatus 50 of FIG. 1A and includes at least one microphone (see microphones 120A, 120B, 120C and 120D) at least one loudspeaker (see loudspeakers 121A, 121B, 121C and 121D). According to some examples, each the audio devices 110A-110D may be a smart audio device, such as a smart speaker.

In this example, the audio devices 110A-110D are rendering content 122A, 122B, 122C and 122D via the loudspeakers 121A-121D. The "echo" corresponding to the content 122A-122D played back by each of the audio devices 110A-110D is detected by each of the microphones 120A-120D. In this example, the audio devices 110A-110D are configured to listen for a command or wakeword in the speech 131 from the person 130 within the audio environment 100.

Figure 2A:
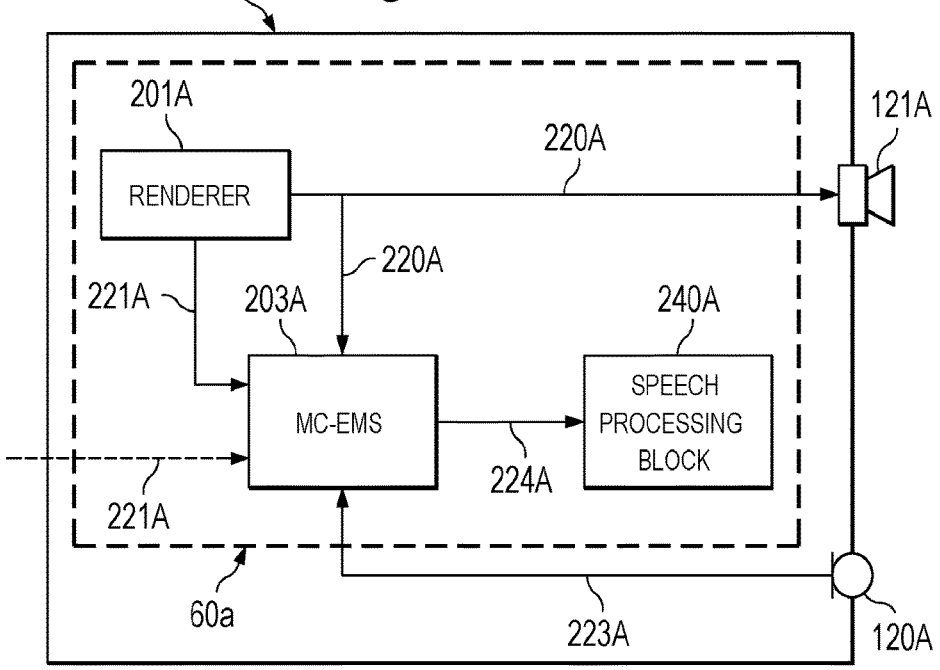
FIG. 2A presents a block diagram of an audio device that is capable of performing at least some disclosed implementations.

FIG. 2A presents a block diagram of an audio device that is capable of performing at least some disclosed implementations. As with other figures provided herein, the types, numbers and arrangement of elements shown in FIG. 2A are merely provided by way of example. Other implementations may include more, fewer and/or different types, numbers and/or arrangements of elements. In this example, the audio device 110A is an instance of the audio device 110A of FIG. 1E. Here, the audio device 110A includes a control system 60a, which is an instance of the control system 60 of FIG. 1A. According to this implementation, the control system 60 is capable of listening to speech 131 of the person 130 in the presence of echo corresponding to the content 122A, 122B, 122C and 122D played back by each audio device in the audio environment 100.

According to this example, the control system 60 is implementing a renderer 201A, a multi-channel acoustic echo management system (MC-EMS) 203A and a speech processing block 240A. The MC-EMS 203A may include an acoustic echo canceller (AEC), an acoustic echo suppressor (AES), or both an AEC and an AES, depending on the particular implementation. According to this example, the speech processing block 240A is configured to detect user wakewords and commands. In some implementations, the speech processing block 240A may be configured for supporting a communications session, such as a telephone call.

In this implementation, the renderer 201A is configured to provide a local echo reference 220A to the MC-EMS 203A. The local echo reference 220A corresponds to (and in this example is identical to) the speaker feed signals provided to the loudspeaker 121A for playback by the audio device 110A. According to this example, the renderer 201A is also configured to provide non-local echo references 221A—corresponding to the content 122B, 122C and 122D played back by the other audio devices in the audio environment 100—to the MC-EMS 203A.

According to some examples, the audio device 110A receives a combined bitstream (e.g., as shown in FIG. 1C) that includes audio data for all of the audio devices 110A-110D of FIG. 1E. In some such examples, the renderer 201A may be configured to isolate the local echo reference 220A from the non-local echo references 221A, to provide the local echo reference 220A to the loudspeaker 121A and to provide the local echo reference 220A and the non-local echo references 221A to the MC-EMS 203A. In some alternative examples, the audio device 110A may receive a bitstream that is only intended for playback on the audio device 110A, e.g., as shown in FIG. 1D. In some such examples, the smart home hub 105 (or the other audio devices 110B-D) may provide the non-local echo references 221A to the audio device 110A, as suggested by the dashed arrow next to reference number 221A in FIG. 2A.

In some instances, the local echo reference 220A and/or the non-local echo references 221A may be full-fidelity replicas of the speaker feed signals provided to the loudspeakers 121A-121D for playback. In some alternative examples, the local echo reference 220A and/or the non-local echo references 221A may be lower-fidelity representations of the speaker feed signals provided to the loudspeakers 121A-121D for playback. In some such examples, the non-local echo references 221A may be downsampled versions of the speaker feed signals provided to the loudspeakers 121B-121D for playback. According to some examples, the non-local echo references 221A may be lossy compressions of the speaker feed signals provided to the loudspeakers 121B-121D for playback. In some examples, the non-local echo references 221A may be banded power information corresponding to the speaker feed signals provided to the loudspeakers 121B-121D for playback.

According to this implementation, the MC-EMS 203A is configured to use the local echo reference 220A and the non-local echo references 221A to predict and cancel and/or suppress the echo from microphone signals 223A, thereby producing the residual signal 224A in which the speech to echo ratio (SER) may have been improved with respect to that in the microphone signals 223A. This residual signal 224A may enable the speech processing block 240A to detect user wakewords and commands. In some implementations, the speech processing block 240A may be configured for supporting a communications session, such as a telephone call.

Some aspects of this disclosure involve making an importance estimation for each echo reference of a plurality of echo references (e.g., for the local echo reference 220A and the non-local echo references 221A). Making the importance estimation may involve determining an expected contribution of each echo reference to mitigation of echo by at least one echo management system of at least one audio device of the audio environment (e.g., the mitigation of echo by the MC-EMS 203A of audio device 110A). Various examples are provided below.

In the context of distributed and orchestrated devices, for the purposes of echo management, according to some examples each audio device may obtain the echo references corresponding to what is played back by one or more other audio devices in an audio environment, in addition to its own echo reference. The impact of including a particular echo reference in a local echo management system or "EMS" (such as the MC-EMS 203A of audio device 110A) may vary according to a multitude of parameters, such as the diversity of the audio content being played out, the network bandwidth required for transmitting the echo reference, the encoding computational requirement for encoding an echo reference if an encoded echo reference is transmitted, the decoding computational requirement for decoding the echo reference, the echo management system computational requirement for using the echo reference by the echo management system, the relative audibility of the audio devices, etc.

For example, if each audio device is rendering the same content, (in other words, if monophonic audio is being played back), then there is little, albeit non-zero, benefit to be made by making additional references available to the EMS. Moreover, due to practical limitations (such as bandlimited networks) it may not be desirable for all devices to share a replica of their local echo reference. Therefore, some implementations may provide a distributed and orchestrated EMS (DOEMS), wherein echo references are prioritized and transmitted (or not) accordingly. Some such examples may implement a tradeoff between the cost (e.g., network bandwidth required and/or computational overhead required) and the benefit (e.g., the expected echo mitigation improvement, which may be measured according to the signal-to-echo ratio (SER) and/or echo return loss enhancement (ERLE)) of each additional echo reference.

Figure 2B:
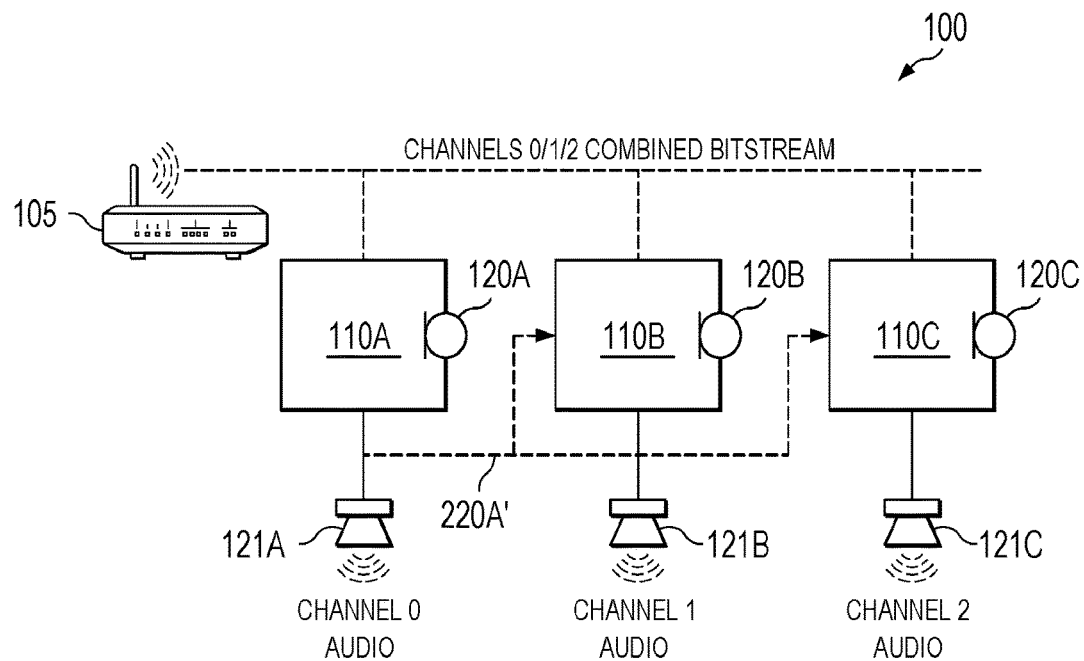
FIGS. 2B and 2C show additional examples of audio devices in an audio environment.
Figure 2C:
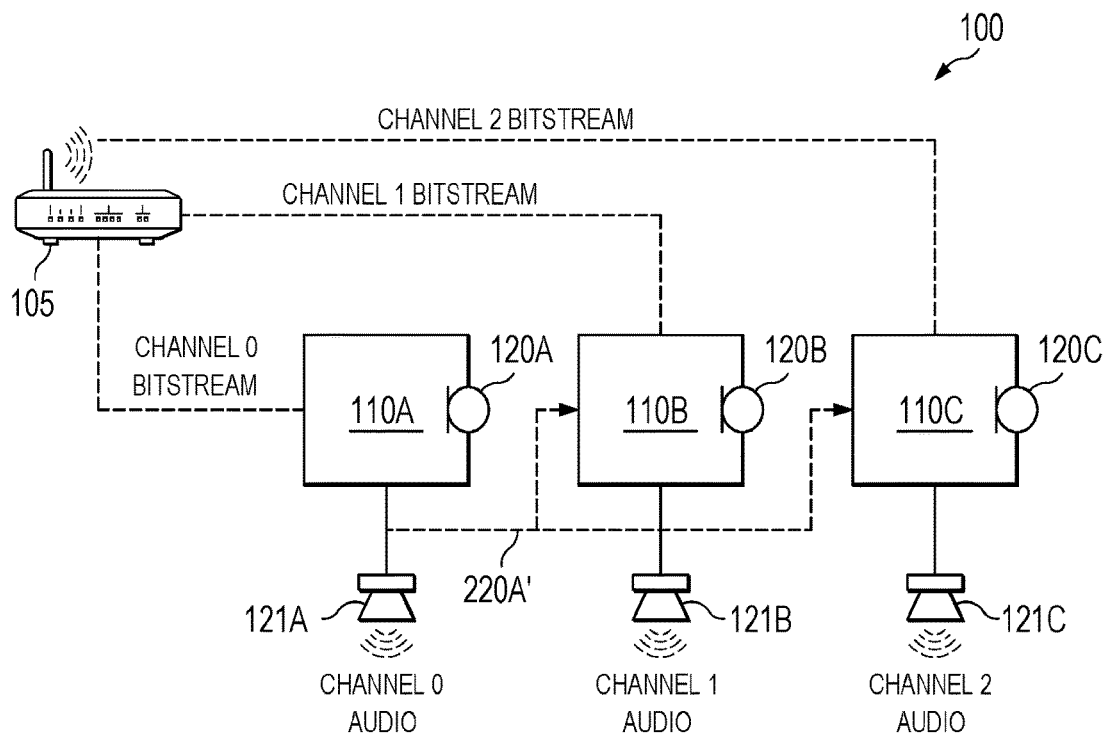

FIGS. 2B and 2C show additional examples of audio devices in an audio environment. According to these examples, the audio environments 100 include a smart home hub 105 and audio devices 110A, 110B and 110C. In these examples, the smart home hub 105 and the audio devices 110A-110C are instances of the apparatus 50 of FIG. 1A. According to these examples, each of the audio devices 110A-110C includes a corresponding one of the microphones 120A, 120B and 120C and a corresponding one of the loudspeakers 121A, 121B and 121C. According to some examples, each the audio devices 110A-110C may be a smart audio device, such as a smart speaker.

In FIG. 2B, the smart home hub 105 sends the same encoded audio bitstream to all of the audio devices 110A-110C. In FIG. 2C, the smart home hub 105 sends only the audio channel that each of the audio devices 110A-110C needs for playback. In both examples, audio channel 0 is intended for playback on audio device 110A, audio channel 1 is intended for playback on audio device 110B and audio channel 2 is intended for playback on audio device 110C.

FIGS. 2B and 2C show examples of echo reference data being shared across a local network. In these examples, the audio device 110A is sending echo reference 220A', which is an echo reference corresponding to the loudspeaker playback of the audio device 110A, over the local network to the audio devices 110B and 110C. In these examples, the echo reference 220A' is different from the channel 0 audio found in the bitstream. In some instances, the echo reference 220A' may be different from the channel 0 audio because of playback post-processing being implemented on the audio device 110A. In the example shown in FIG. 2C, the combined bitstream is not provided to all of the audio devices 110A-110C, so another device (such as the audio device 110A or the smart home hub 105) provides the echo reference 220A'. In the scenario depicted in FIG. 2B, even though the combined bitstream is provided to all of the audio devices 110A-110C, the echo reference 220A' may nonetheless need to be transmitted in some such instances.

In other examples, the echo reference 220A' may be different from the channel 0 audio because the echo reference 220A' may not be a full-fidelity replica of the audio data being played back on the audio device 110A. In some such examples, the echo reference 220A' may correspond to the audio data being played back on the audio device 110A, but may require relatively less data than the complete replica and therefore may consume relatively less bandwidth of the local network when the echo reference 220A' is transmitted.

According to some such examples, the audio device 110A may be configured for making a downsampled version of the local echo reference 220A that is described above with reference to FIG. 2A. In some such examples, the echo reference 220A' may be, or may include, the downsampled version.

In some examples, the audio device 110A may be configured for making a lossy compression of the local echo reference 220A. In such instances, the echo reference 220A' may be a result of the control system 60a applying a lossy compression algorithm to the local echo reference 220A.

According to some examples, audio device 110A may be configured for providing banded power information to the audio devices 110B and 110C corresponding to the local echo reference 220A. In some such examples, instead of transmitting a full-fidelity replica of the audio data being played back on the audio device 110A, the control system 60a may be configured to determine a power level of the audio data being played back on the audio device 110A in each of a plurality of frequency bands and to transmit the corresponding banded power information to the audio devices 110B and 110C. In some such examples, the echo reference 220A' may be, or may include, the banded power information.

FIG. 3A presents a block diagram that shows components of an audio device according to one example. As with other figures provided herein, the types, numbers and arrangement of elements shown in FIG. 3A are merely provided by way of example. Other implementations may include more, fewer and/or different types, numbers and/or arrangements of elements. For example, some implementations may be configured to send and/or receive either "raw" echo references (which may be complete, full-fidelity replicas of audio being reproduced on an audio device), a lower-fidelity version or representation of the audio being reproduced on an audio device (such as a downsampled version, a version produced by lossy compression, or banded power information corresponding to the audio being reproduced on an audio device), but not both the raw and lower-fidelity versions.

In this example, the audio device 110A is an instance of the audio device 110A of FIG. 1E and includes a control system 60a, which is an instance of the control system 60 of FIG. 1A. According to this example, the control system 60a is configured to implement a renderer 201A, a multi-channel acoustic echo management system (MC-EMS) 203A, a speech processing block 240A, an echo reference orchestrator 302A, a decoder 303A and a noise estimator 304A. The reader may assume that the MC-EMS 203A and the speech processing block 240A function as described above with reference to FIG. 2A unless the following description of FIG. 3A indicates otherwise. In this example, the network interface 301A is an instance of the interface system 55 that is described above with reference to FIG. 1A.

In this example, the elements of FIG. 3A are as follows:
110A: an audio device;
120A: a representative microphone. The audio device 110A may have more than one microphone in some implementations;
121A: a representative loudspeaker. The audio device 110A may have more than one loudspeaker in some implementations;
201A: a renderer that produces references for local playback and echo references to model the audio that is played back by the other audio devices in the audio environment;

203A: a multi-channel acoustic echo management system (MC-EMS), which may include an acoustic echo canceller (AEC) and/or an acoustic echo suppressor (AES);

220A: a local echo reference for playback and cancellation;

221A: a locally-produced copy of echo references that one or more non-local audio devices (one or more other audio devices in the audio environment) are playing;

223A: a plurality of microphone signals;

224A: a plurality of residual signals (the microphone signal after the MC-EMS 203A has cancelled and/or suppressed the predicted echo);

240A: a speech processing block configured for wake-word detection, voice command detection and/or providing telephonic communication;

301A: a network interface configured for communication between audio devices, which also may be configured for communication via the Internet and/or via one or more cellular networks;

302A: an echo reference orchestrator configured to rank echo references and select an appropriate set of one or more echo references;

303A: an audio decoder block;

304A: a noise estimator block;

310A: one or more decoded echo references received by audio device 110A from one or more other devices in the audio environment;

311A: A request for echo references to be sent over the local network from one or more other devices, such as a smart home hub or one or more of the audio devices 110B-110D;

312A: metadata, which may be, or may include, metadata corresponding to an audio device layout, loudspeaker metadata, metadata corresponding to received audio data, an upmixing matrix and/or a matrix of loudspeaker activations;

313A: echo references selected by the echo reference orchestrator 302A;

314A: echo references received by device 110A from one or more other devices;

315A: echo references sent from device 110A to other devices;

316A: raw echo references received by device 110A from one or more other devices of the audio environment;

317A: lower-fidelity (e.g., coded) versions of echo references received by device 110A from one or more other devices of the audio environment;

318A: an audio environment noise estimate;

350A: one or more metrics indicating the current performance of the MC-EMS 203A, which may be, or may include, adaptive filter coefficient data or other AEC statistics, speech-to-echo (SER) ratio data, etc.

The echo reference orchestrator 302A may function in various ways, depending on the particular implementation. Many examples are disclosed herein. In some examples, the echo reference orchestrator 302A may be configured for making an importance estimation for each echo reference of a plurality of echo references (e.g., for the local echo reference 220A and the non-local echo references 221A). Making the importance estimation may involve determining an expected contribution of each echo reference to mitigation of echo by at least one echo management system of at least one audio device of the audio environment (e.g., the mitigation of echo by the MC-EMS 203A of audio device 110A).

Some examples of making the importance estimation may involve determining an importance metric. In some such examples, the importance metric may be based, at least in part, on one or more characteristics of each echo reference, such as level, uniqueness, temporal persistence, audibility, or one or more combinations thereof. In some examples, the importance metric may be based, at least in part, on metadata (e.g., the metadata 312A), such as metadata corresponding to an audio device layout, loudspeaker metadata, metadata corresponding to received audio data, an upmixing matrix, a matrix of loudspeaker activations, or one or more combinations thereof. In some examples, the importance metric may be based, at least in part, on a current listening objective, a current ambient noise estimate, an estimate of a current performance of at least one echo management system, or one or more combinations thereof.

According to some examples, the echo reference orchestrator 302A may be configured for selecting a set of one or more echo references based, at least in part, on a cost determination. In some examples, the echo reference orchestrator 302A may be configured to make the cost determination, whereas in other examples another block of the control system 60a may be configured to make the cost determination. In some instances, the cost determination may involve determining a cost for at least one echo reference of a plurality of echo references, or in some cases for each of the plurality of echo references. In some examples, the cost determination may be based on network bandwidth required for transmitting the echo reference, an encoding computational requirement for encoding the at least one echo reference, a decoding computational requirement for decoding the at least one echo reference, a downsampling cost of making a downsampled version of the echo reference, an echo management system computational requirement for use of the at least one echo reference by the echo management system, or one or more combinations thereof.

According to some examples, the cost determination may be based on a replica of the at least one echo reference in a time domain or a frequency domain, on a downsampled version of the at least one echo reference, on a lossy compression of the at least one echo reference, on banded power information for the at least one echo reference, or one or more combinations thereof. In some instances, the cost determination may be based on a method of compressing a relatively more important echo reference less than a relatively less important echo reference. In some implementations, the echo reference orchestrator 302A (or another block of the control system 60a) may be configured for determining a current echo management system performance level (e.g., based at least in part on the metric(s) 350A). In some such examples, selecting the one or more selected echo references may be based, at least in part, on the current echo management system performance level.

Depending on the distributed audio device system, its configuration and the type of audio session (e.g., communication vs. listening to music) and/or the nature of the content being rendered, the rate at which the importance of each echo reference is estimated and the rate at which the set of echo references is evaluated may differ. Moreover, the rate at which the importance is estimated need not be equal to the rate at which the echo reference selection process makes decisions. If the two are not synchronized, in some examples the importance calculation would be more frequent. In some instances, the echo reference selection may be a discrete process wherein binary decisions are made either to include or not include particular echo references.

Figure 3B:
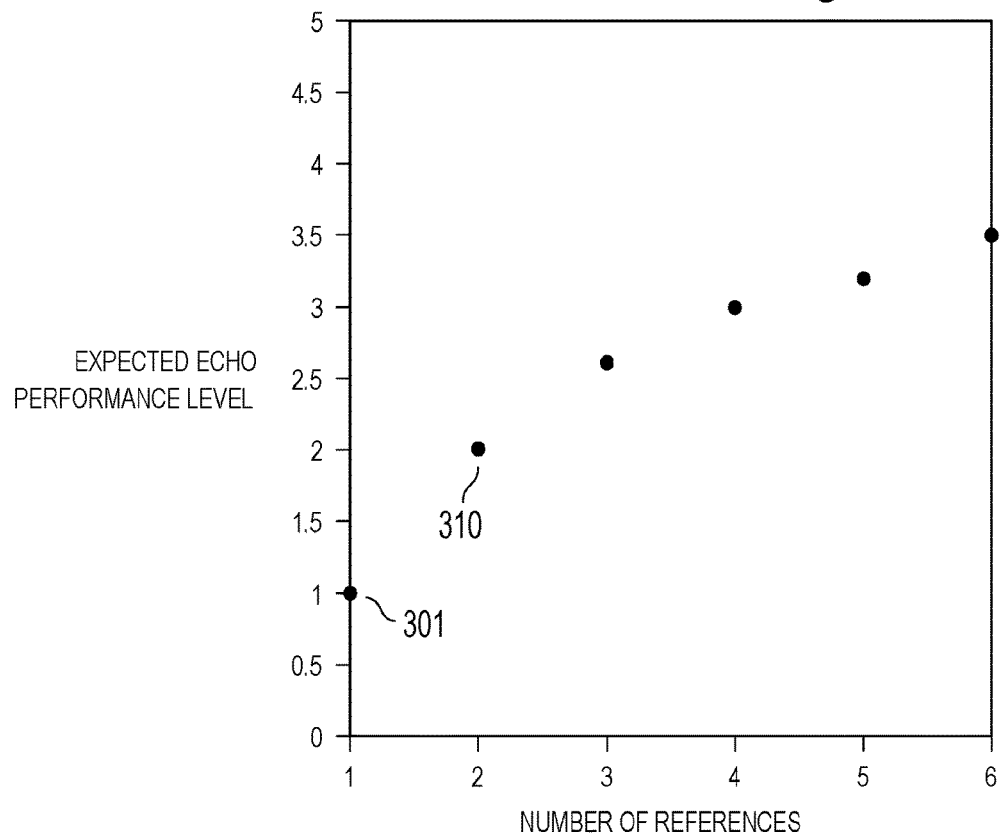
FIGS. 3B and 3C are graphs that show examples of the expected echo management performance versus the number of echo references used for echo management.
Figure 3C:
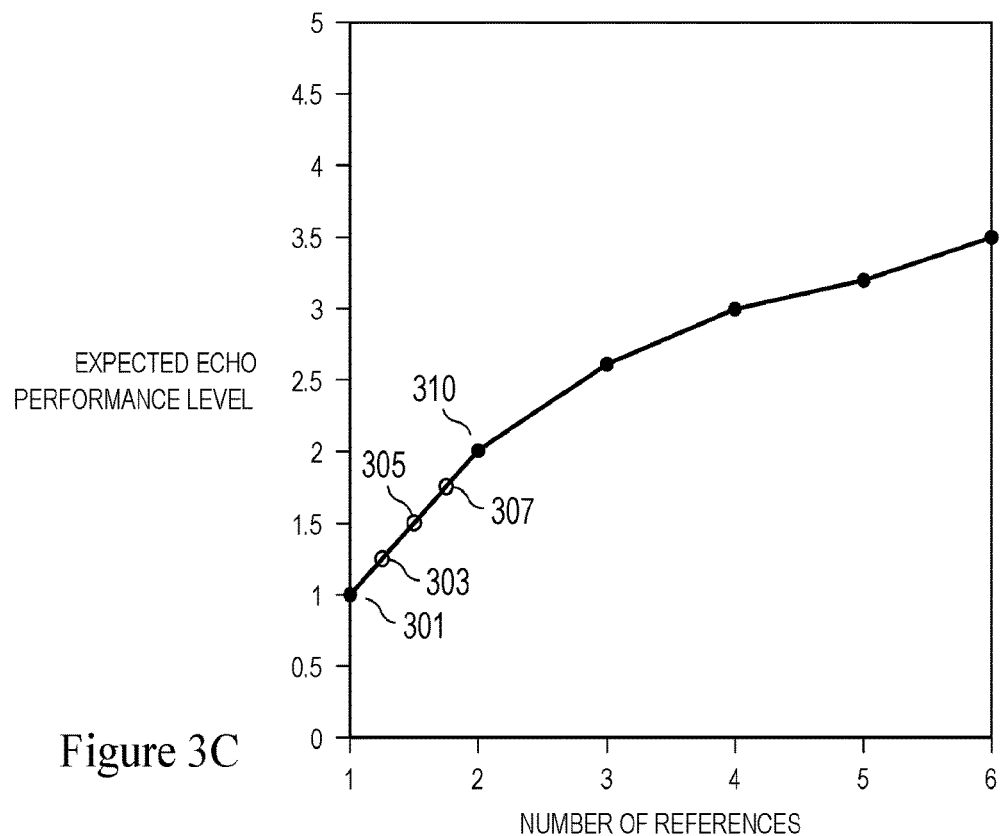

FIGS. 3B and 3C are graphs that show examples of the expected echo management performance versus the number of echo references used for echo management. In FIG. 3B, one may see that as additional references are added, the expected echo performance increases. However in this example, one may see that there are only a few discrete points at which that the system can operate. In some examples, the points shown in FIG. 3B may correspond to processing complete, full-fidelity replicas of each echo reference. For example, point 301 may correspond to an instance of processing a local echo reference (e.g., the local reference 220A of FIG. 2A or FIG. 3A) and point 310 may correspond to an instance of receiving a complete replica of a first non-local echo reference (e.g., a full-fidelity version of one of the received echo references 314A of FIG. 3A, which may have been selected as the most important non-local echo reference) and processing both the local echo reference and the complete replica of the first non-local echo reference.

FIG. 3C illustrates one example of operating between any two of the discrete operating points that are shown in FIG. 3B. The lines connecting the points in FIG. 3B may, for example, correspond to a range of echo reference fidelities, including lower-fidelity versions or representations of each echo reference. For example, points 303, 305 and 307 may correspond to copies, or representations, of the first non-local echo reference at increasing levels of fidelity, with point 303 corresponding to the lowest-fidelity representation and point 307 corresponding to the highest-fidelity representation other than the full-fidelity replica. In some examples, point 303 may correspond to banded power information for the first non-local echo reference. According to some examples, points 305 and 307 may correspond to a relatively more lossy compression of the first non-local echo reference and a relatively less lossy compression of the first non-local echo reference, respectively.

The fidelity of the copies, or representations, of the echo references will generally correlate inversely to the number of bits required for each such copy or representation. Accordingly, the fidelity of the copies, or representations, of the echo references provides an indication of the tradeoff between network cost (due to the varying number of bits required for transmission) and the expected echo management performance (because the performance should improve as the fidelity increases). Note that the straight lines used to connect the points in FIG. 3C merely represent one of many different possible trajectories, in part because the incremental change from one echo reference to the next depends on which echo reference would be selected as the next echo reference and in part because there may not be a linear relationship between the expected echo management performance and fidelity.

Figure 4:
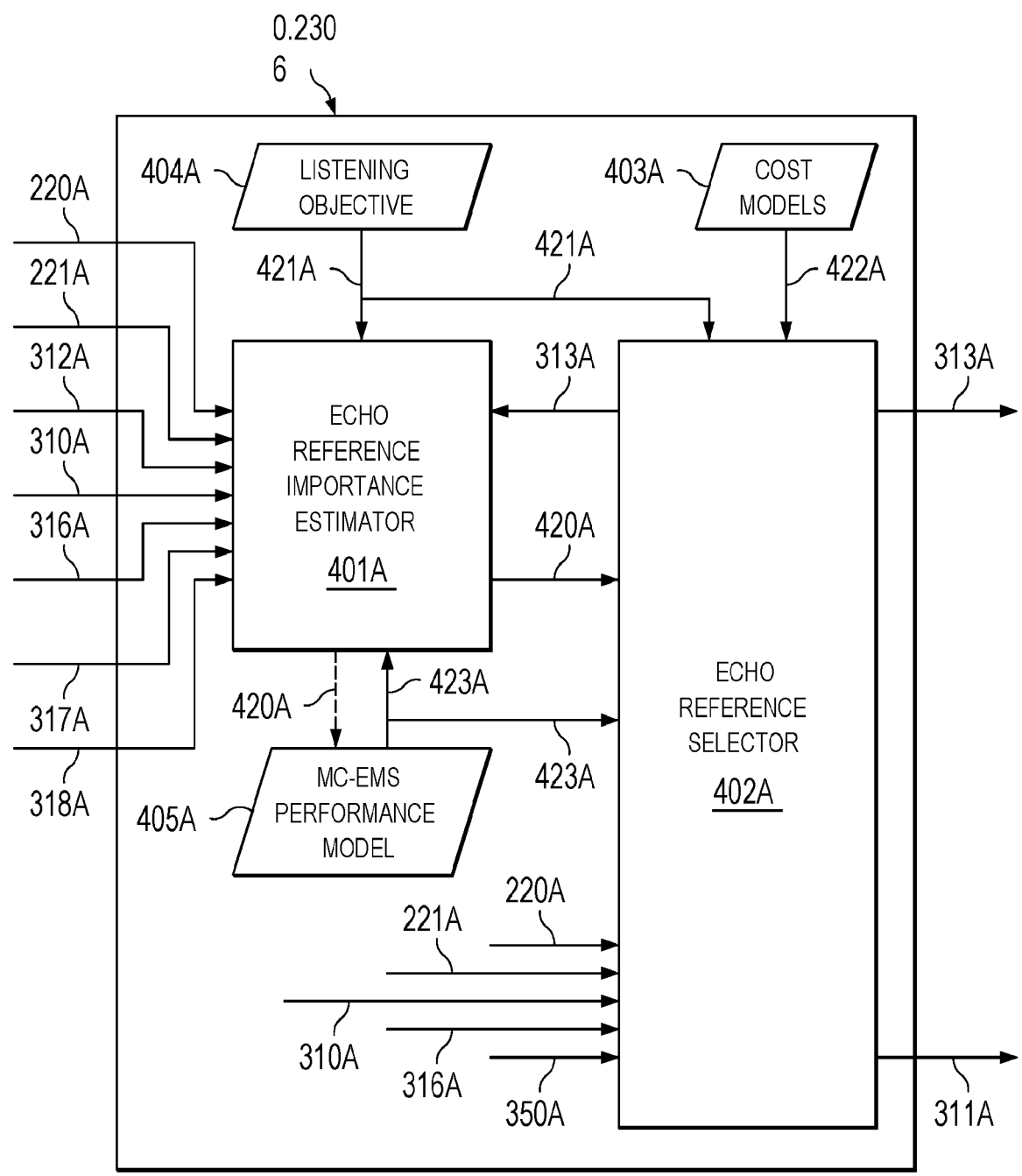
FIG. 4 presents a block diagram that shows components of an echo reference orchestrator according to one example.

FIG. 4 presents a block diagram that shows components of an echo reference orchestrator according to one example. As with other figures provided herein, the types, numbers and arrangement of elements shown in FIG. 4 are merely provided by way of example. Other implementations may include more, fewer and/or different types, numbers and/or arrangements of elements. For example, some implementations may be configured to send and/or receive either "raw" echo references (which may be full-fidelity replicas of audio being reproduced on an audio device), lower-fidelity versions or representations of the audio being reproduced on an audio device (such as downsampled versions, versions produced by lossy compression, or banded power information corresponding to the audio being reproduced on an audio device), but not both the raw and lower-fidelity versions.

In this example, the echo reference orchestrator 302A is an instance of the echo reference orchestrator 302A of FIG. 3A and is implemented by an instance of the control system 60a of FIG. 3A. According to this example, the elements of FIG. 4 are as follows:

220A: a local echo reference for playback and cancellation;

221A: a locally-produced copy of a non-local echo reference that another audio device of the audio environment is playing;

302A: the echo reference orchestrator, a module that is configured to rank and select a set of one or more echo references;

310A: one or more decoded echo references received by audio device 110A from one or more other devices in the audio environment;

311A: a request for echo references to be sent over the local network from one or more other devices of the audio environment;

312A: metadata, which may be, or may include, metadata corresponding to an audio device layout, loudspeaker metadata, metadata corresponding to received audio data, an upmixing matrix and/or a matrix of loudspeaker activations;

313A: a set of one or more echo references selected by the echo reference orchestrator 302A and sent to the MC-EMS 203A in this example;

316A: raw echo references received by device 110A from one or more other devices of the audio environment;

317A: lower-fidelity (e.g., coded) versions of echo references received by device 110A from one or more other devices of the audio environment;

318A: an audio environment noise estimate;

350A: one or more metrics indicating the current performance of the MC-EMS 203A, which may be, or may include, adaptive filter coefficient data or other AEC statistics, speech-to-echo (SER) ratio data, etc.

401A: an echo reference importance estimator, which is configured to estimate the expected importance of each echo reference and, in this example, to generate corresponding importance metrics 420A;

402: an echo reference selector that is configured to select the set of echo references 313A, in this example based at least in part on the current listening objective (as indicated by 421A), the cost of each echo reference (as indicated by 422A), the current state/performance of the EMS (as indicated by 350A) and the estimated importance of each candidate echo reference (as indicated by importance metrics 420A);

403A: a cost estimation module that is configured to determine the cost(s) (e.g., the computational and/or network costs) of including an echo reference in the set of echo references 313A;

404A: an optional module that determines or estimates the current listening objective of the audio device 110A;

405A: a module configured to implement one or more MC-EMS performance models, which may in some examples produce data such as shown in FIG. 3B or FIG. 3C;

420A: importance metrics 420A generated by the echo reference importance estimator 401A;

421A: information indicating the current listening objective;

422A: information indicating the cost(s) of including an echo reference in the set of echo references 313A; and 423A: information produced by the MC-EMS performance model 405A, which may in some examples be, or include, data such as shown in FIG. 3B or FIG. 3C.

The echo reference importance estimator 401A may function in various ways, depending on the particular implementation. Various examples are provided in this disclosure. In some examples, the echo reference importance estimator 401A may be configured for making an importance estimation for each echo reference of a plurality of echo references (e.g., for the local echo reference 220A and the non-local echo references 221A). Making the importance estimation may involve determining an expected contribution of each echo reference to mitigation of echo by at least one echo management system of at least one audio device of the audio environment (e.g., the mitigation of echo by the MC-EMS 203A of audio device 110A).

In this example, making the importance estimation involves determining importance metrics 420A. The importance metrics 420A may be based, at least in part, on one or more characteristics of each echo reference, such as level, uniqueness, temporal persistence, audibility, or one or more combinations thereof. In some examples, an importance metric may be based, at least in part, on metadata (e.g., the metadata 312A), which may include metadata corresponding to an audio device layout, loudspeaker metadata (e.g., the sound pressure level (SPL) ratings, frequency ranges, whether the loudspeaker is an upwards-firing loudspeaker, etc.), metadata corresponding to received audio data (e.g., positional metadata, metadata indicating vocals or other speech, etc.), an upmixing matrix, a matrix of loudspeaker activations, or one or more combinations thereof. In some instances, as suggested by the dashed arrow 420A, the echo reference importance estimator 401A may provide importance metrics 420A to the MC-EMS performance model 405A.

According to this example, the importance metrics 420A are based, at least in part, on a current listening objective, as indicated by the information 421A. As described in more detail below, the current listening objective may significantly change how factors such as level, uniqueness, temporal persistence, audibility, etc., are evaluated. For example, the importance analysis may be very different during a telephone call than when awaiting a wakeword.

In this example, the importance metrics 420A are based, at least in part, on the current ambient noise estimate 318A, the metric(s) 350A indicating the current performance of the MC-EMS 203A, information 423A produced by the MC-EMS performance model 405A, or one or more combinations thereof. In some implementations, the echo reference importance estimator 401A may determine that a relatively higher room noise level (as indicated by the current ambient noise estimate 318A) will make it less likely that adding an echo reference will help mitigate echo significantly. As noted above, information 423A may correspond to the type of information that is described above with reference to FIGS. 3B and 3C, which may provide a direct correlation between the use of an echo reference and the expected increase in performance by the MC-EMS 203A. As described in more detail below, the performance of an EMS may be based in part on the robustness of the EMS when perturbed by noise in the audio environment.

According to this implementation, the echo reference selector 402 selects a set of one or more echo references based, at least in part, on one or more metrics 350A indicating the current performance of the MC-EMS 203A, the importance metrics 420A, the current listening objective 421A, information 422A indicating the cost(s) of including an echo reference in the set of echo references 313A and information 423A produced by the MC-EMS performance model 405A. Some detailed examples of how the echo reference selector 402 may select echo references are provided below.

In this example, the cost estimation module 403A is configured to determine the computational and/or network costs of including an echo reference in the set of echo references 313A. The computational cost may, for example, include the additional computational cost of use, by the MC-EMS 203A, of a particular echo reference. This computational cost may depend, in turn, on the number of bits required to represent the echo reference. In some examples, the computational cost may include the computational cost of a lossy echo reference encoding process and/or the computational cost of a corresponding echo reference decoding process. Determining the network costs may involve determining the amount of data required to send a complete replica of an echo reference or a copy or representation of the echo reference across a local data network (e.g., a local wireless data network).

In some instances, the echo reference selection block 402A may generate and transmit a request 311A for another device in the audio environment to send one or more echo references to it over the network. (Element 314A of FIG. 3A indicates one or more echo references being received by the audio device 110A, which may in some instances have been responsive to a request 311A). In some examples, the request 311A may specify the fidelity of the requested echo reference, e.g., whether a "raw" copy (a full-fidelity replica) of the echo reference should be sent, whether an encoded version of the echo reference should be sent, if an encoded version of the echo reference should be sent, whether a relatively more or relatively less lossy compression algorithm should be applied to the echo reference, whether banded power information corresponding to the echo reference should be sent, etc.

One may note that a request for an encoded echo reference not only introduces a network cost due to sending the request and the reference, but also adds a computational cost for the responding device(s) (e.g., the smart home hub 105 or one or more of the audio devices 110B-110D) that must encode the reference, as well as the computational cost for the audio device 110A to decode the received reference. However, this encoding cost may be a one-time cost. Accordingly, the request from one audio device to another to send an encoded reference over the network changes the potential performance/cost tradeoff being performed in other devices (e.g., in audio devices 402C and 402D).

In some implementations, one or more of the blocks of the echo reference orchestrator 302A may be performed by an orchestrating device, e.g., the smart home hub 105 or one of the audio devices 110A-110D. According to some such implementations, at least some functionality of the echo reference importance estimator 401A and/or the echo reference selection block 402A may be performed by the orchestrating device. Some such implementations may be capable of determining cost/benefit trade-offs on a systemwide basis, taking into account the performance enhancements of all instances of the MC-EMS in the audio environment, the overall computational demands for all instances of the MC-EMS, the overall demands on the local network and/or the overall computational demands for all encoders and decoders.

Examples of Various Metrics and Components
The Importance Metric

Simply stated, the importance metric (which may be referred to herein as "Importance" or "I") may be a measure of the expected improvement in performance of an EMS due to the inclusion of a particular echo reference. In some embodiments, Importance may depend on the present state of the EMS, particularly on the set of echo references already in use and at what level of fidelity they are being received. Importance may be available at different timescales, depending on the particular implementation. On one extreme, Importance may be implemented on a frame-by-frame basis (e.g., according to an Importance signal for each frame). In other examples, Importance may be implemented as a constant value for the duration of a content segment, or as a constant value for the time during which a particular configuration of audio devices is in use. The configuration of audio devices may correspond to audio device positions and/or audio device orientations.

Accordingly, the Importance metric may be calculated on a variety of timescales depending on the particular implementation, e.g.:

In real time, e.g., by analyzing the current audio content, according to events in the audio environment (e.g., an incoming telephone call), etc.;

On a longer time scale, e.g., on a per-track basis, wherein a track corresponds to a content segment such as a song or other musical content segment that may, for example, persist on a time scale of minutes; or Only once, e.g., when an audio system is initially configured or is reconfigured.

Decisions regarding which echo references are to be selected for the purposes of echo management can be made on a similar (or slower) time scale that that at which the importance metric is evaluated. For example, a device or system might estimate importance every 30 seconds and make a decision about changing the selected echo references every few minutes.

According to some examples, a control system may be configured to determine an Importance matrix, which may include all the importance information for a present system of audio devices. In some such examples, Importance matrix may have dimension N×M, including an entry for each audio device and an entry for each potential echo reference channel. In some such examples, N represents the number of audio devices and M represents the number of potential echo references. Because some audio devices may play back more than one channel, this type of Importance matrix will not always be square.

In some implementations, the importance metric I may be based on one or more of the following:

L: the level of an echo reference;
U: the uniqueness of the echo reference;
P: the temporal persistence of the echo reference, and/or
A: the audibility of the device rendering the echo reference.

As used herein, the acronym "LUPA" refers generally to echo reference characteristics from which the importance metric may be determined, including but not limited to one or more of L, U, P and/or A.

L or the "Level" Aspect

This aspect describes the level or loudness of the echo reference. All other things being equal, it is well known that louder playback signals have an increased impact on EMS performance. As used herein, the term "level" refers to the level within the digital representation of an audio signal, and not necessarily to the actual sound pressure level of the audio signal after being reproduced via a loudspeaker. In some examples, the loudness of a single channel of echo reference may be based on a root mean square (RMS) metric or an LKFS (loudness, k-weighted, relative to full scale) metric. Such metrics are easily computed on the echo references in real-time, or may be present as metadata in a bitstream. According to some implementations, L may be determined according to a volume setting, such as an audio system volume setting or a volume setting within a media application.

U or the "Uniqueness" Aspect

The uniqueness aspect is intended to capture the amount of new information that a particular echo reference provides about an overall audio presentation. From a statistical point of view, multichannel audio presentations often contain redundancy across channels. This redundancy may, for example, occur because instruments and other sound sources are replicated across channels on the left and right sides of a room, or as signals are panned and thus further replicated in multiple active loudspeakers at the same time. Even though such scenarios result in an over-specified problem for an EMS to solve (where echo filters may infer observations from multiple echo paths), some benefits and higher performance can nonetheless be observed in practice.

U may be computed or estimated in various ways. In some examples U may be based, at least in part, on the correlation coefficient between each echo reference. In one such example, U may be estimated as follows:
$U_r = 1 - \max_r(\Sigma_{m=0}^{M} \Sigma_{n=0}^{N} x_r[n] x_m[n])$, wherein the subscript "r" corresponds with a particular echo reference being evaluated, N represents the total number of audio devices in an audio environment, n represents an individual audio device, M represents the total number of potential echo references in the audio environment and m represents an individual echo reference.

Alternatively, or additionally, in some examples U may be based, at least in part, on decomposition of audio signals to find redundancies. Some such examples may involve instantaneous frequency estimation, fundamental frequency (F0) estimation, spectrogram inversion and/or nonnegative matrix factorization (NMF).

According to some examples U may be based, at least in part, on data used for matrix decoding. Matrix decoding is an audio technology in which a small number of discrete audio channels (e.g., 2) are decoded into a larger number of channels on play back (e.g., 4 or 5). The channels are generally arranged for transmission or recording by an encoder, and decoded for playback by a decoder. Matrix decoding allows multichannel audio, such as surround sound, to be encoded in a stereo signal, to be played back as stereo on stereo equipment, and to be played back as surround on surround equipment. In one such example, if a stream of stereo audio data were being received by a Dolby 5.1 system, a static upmixing matrix could be applied to the stereo audio data in order to provide properly rendered audio for each of the loudspeakers in the Dolby 5.1 system. According to some examples U may be based, at least in part, on the coefficients of an up-mixing or down-mixing matrix used to address each of the loudspeakers of an audio environment (e.g., each of the audio devices 110A-110D) with audio.

In some examples U may be based, at least in part, on a standard canonical loudspeaker layout used in the audio environment (e.g., Dolby 5.1, Dolby 7.1, etc.) Some such examples may involve leveraging the way media content is traditionally mixed and presented in such a canonical loudspeaker layout. For example, in a Dolby 5.1 or a Dolby 7.1 system, artists typically put vocals in the center channel, but not surround channels. As noted above, audio corresponding to musical instruments and other sound sources is typically replicated across channels on the left and right sides of a room. In some instances, vocals, dialogue, instrumental music, etc., may be identified via metadata received with the corresponding audio data.

P or the "Persistence" Aspect

The persistence metric is intended to capture the aspect that different types of played-back media may have a wide range of temporal persistence, with different types of content having varying degrees of silence and loudspeaker activation. A continuous stream of spectrally dense content (such as music or the audio output of a video game console) may have a high level of temporal persistence, whereas podcasts may have a lower level of temporal persistence. Infrequent system notifications will have a very low level of temporal persistence. Echo references corresponding to media with a low degree of persistence may be less important for an EMS, depending on the specific listing task at hand. For instance, an occasional system notification is less likely to collide with a wake-word or barge-in request, and thus the relative importance of managing this echo is low.

Following are examples of metrics that may be used to measure or estimate persistence:

The percentage of time over a recent history window in which the playback signal is above a certain digital loudness threshold;

A metadata tag or media classification indication that the content corresponds to music, broadcast content, podcast or system sounds; and/or The percentage of the time during a recent history window in which the playback signal in a typical frequency range for the human voice (e.g., 100 Hz to 3 KHz).

According to some examples, the audio content type may affect estimates of L, U and/or P. For example, knowing that the audio content is stereo music would allow the ranking of all of the echo references using just the channel assignment mentioned above. Alternatively, knowing that the audio content is Atmos could alter default L, U and/or P assumptions if the control system were not to analyze the audio content but instead to rely on the channel assignment.

A or the "Audibility" Aspect

The audibility metric is directed to the facts that audio devices have different playback characteristics and may be located at varying distances from one another in any given audio environment. Following are examples of metrics that may be used to measure or estimate audio device audibility Direct measurements of audio device audibility;

Referring to a data structure that includes characteristics of one or more loudspeakers of the audio device, such as the rated SPL, frequency response and directivity (e.g., whether a loudspeaker is omnidirectional, front-firing, upward-firing, etc.);

An estimation based on the distance to the audio device; and/or

Any combination of the above.

Other factors may be evaluated to estimate importance and, in some instances, to determine an importance metric.

Listening Objective

The listening objective may define the context and desired performance characteristics of the EMS. In some examples, the listening objective may modify the parameters and/or the domain over which LUPA is evaluated. The following discussion will consider 3 potential contexts in which the listening objective changes. In these different contexts, we will see how Probability and Criticality can affect LUPA.

1. Barge in (e.g., an Instance of Detecting a Wakeword)

When waiting for barge in, there is no immediate urgency: all time intervals in the future are normally considered to have an equal probability of a wakeword being spoken by the user. Furthermore, the wakeword detector is likely to be the most robust element of the voice assistant and the effect of echo leakage is less critical.

2. Command

Immediately after a wakeword is spoken by a person, the likelihood of the person speaking a command is extremely high. Therefore, there is a high probability of collision with echo in the immediate future. Furthermore, because the command recognition module may be relatively less robust than the wakeword detector, the criticality of echo leakage will generally be high.

3. Communications

During a voice call the likelihood of any participant (both for the person(s) in the audio environment and the person(s) at the far end) speaking to one another is certain. In other words, the probability of a collision of echo with the users voice is essentially 1. However, because the person or persons at the far end are human and can deal extremely well with background noise, the criticality is small because they are unlikely to be bothered by echo leakage.

During these different listening objective contexts, in some examples the way LUPA is evaluated may change.

1. Barge in

There may be no temporal discrimination because all future time intervals are considered to have equal probability of a wakeword being spoken. Thus, the temporal range over which a control system evaluates LUPA may be quite long in order to obtain better estimates of those parameters. In some such examples, the time interval over which a control system evaluates LUPA may be set to look relatively far into the future (e.g., over a time frame of minutes).

2. Command

The time intervals immediately following a wakeword being spoken are very likely to have a command being spoken. Therefore, after the wakeword is detected, in some implementations LUPA may be evaluated over much shorter timescales than in the barge-in context, e.g., on the order of second. In some examples, references that are temporally sparse and which have content playing within the next few seconds after wakeword detection will be considered much more important during this time interval, now that the likelihood of a collision is high.

Figure 5A:
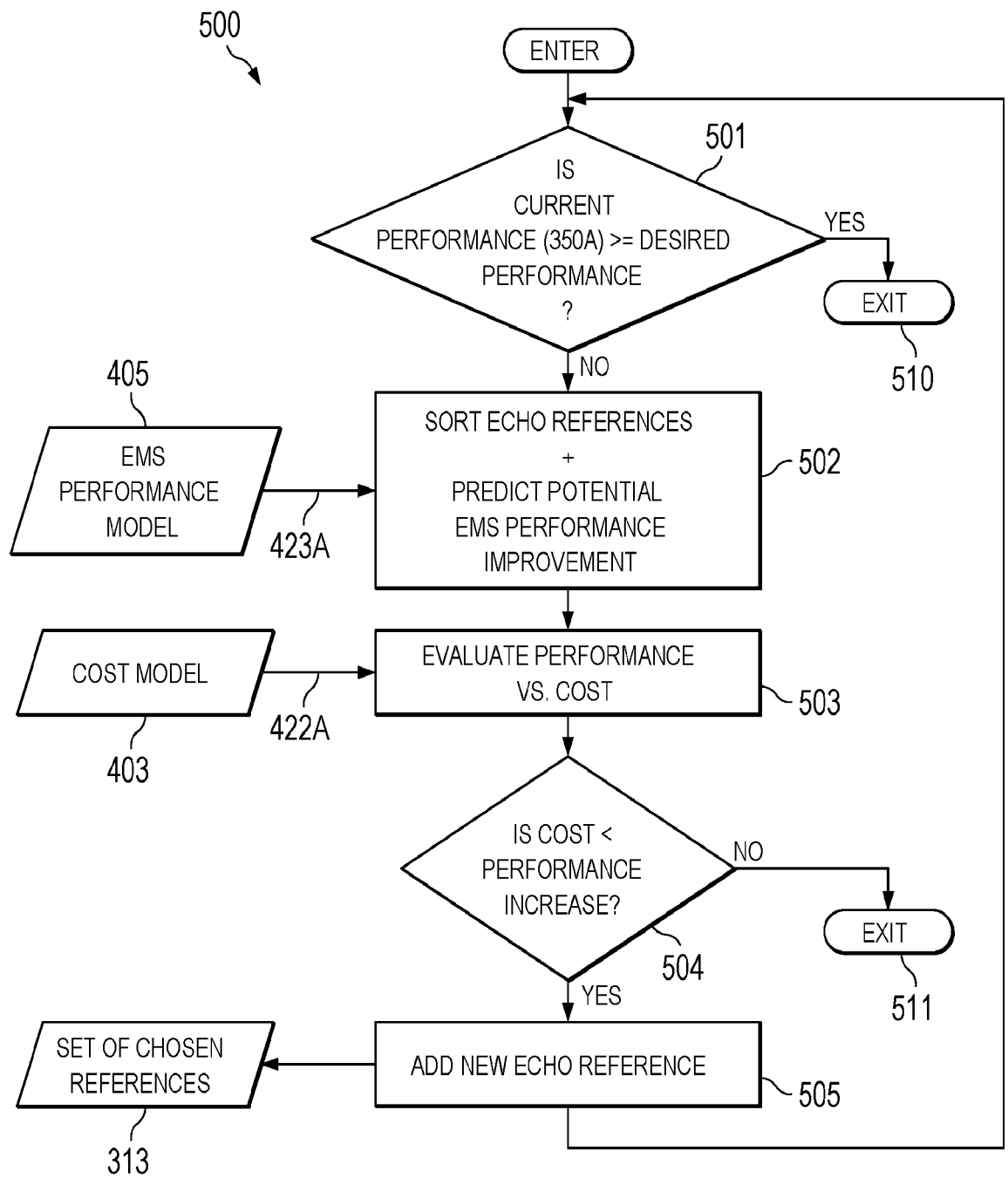
FIG. 5A is a flow diagram that outlines one example of a disclosed method.

FIG. 5A is a flow diagram that outlines one example of a disclosed method. The blocks of method 500, like other methods described herein, are not necessarily performed in the order indicated. In some examples, one or more blocks may be performed concurrently. Moreover, such methods may include more or fewer blocks than shown and/or described. For example, some implementations may not include block 501.

In this example, method 500 is an echo reference selection method. The blocks of method 500 may, for example, be performed by a control system, such as the control system 60a of FIG. 2A or FIG. 3A. In some examples, the blocks of method 500 may be performed by an echo reference selector module, such as the echo reference selector 402A that is described above with reference to FIG. 4.

The reference selection method of FIG. 5A is an example of what may be referred to herein as a "greedy" echo reference selection method, which involves evaluating the cost and expected performance increase only at the MC-EMS's current operating point (in other words, how many references the MC-EMS is currently using, including the echo references that haven been selected), and evaluating the results of adding each additional echo reference, e.g., in decreasing order of importance. Accordingly, this example involves a process of determining whether to add new echo references. In some implementations, the echo reference(s) being evaluated in method 500 may already have been ranked (e.g., by the echo reference importance estimator 401A) according to estimated importance. More optimal, in terms of both cost and performance, types of solutions may exist if more elaborate techniques are employed such as tree search methods. Alternative examples may involve other search and/or optimization routines, including brute force methods. Some alternative implementations may involve determining whether to drop or discard a previously-selected echo reference.

In this example, block 501 involves determining whether or not a current performance level of an EMS is greater than or equal to a desired performance level. If so, the process terminates (block 510). However, if it is determined that the current performance level is less than a desired performance level, in this example the process continues to block 502. According to this example, the determination of block 501 is based, at least in part, on one or more metrics indicating the current performance of the EMS, such as adaptive filter coefficient data or other AEC statistics, speech-to-echo (SER) ratio data, etc. In some examples wherein the determination of block 501 is made by the echo reference orchestrator 302A, this determination may be based, at least in part, on the one or more metrics 350A from the MC-EMS 203A. As noted above, some implementations may not include block 501.

According to this example, block 502 involves ranking the remaining unselected echo references by importance and estimating the potential EMS performance increase to be gained by including the most important echo reference that is not yet being used by the EMS. In some examples wherein the process of block 502 is performed by the echo reference orchestrator 302A, this process may be based, at least in part, on information 423A produced by the MC-EMS performance model 405A, which may in some examples be, or include, data such as shown in FIG. 3B or FIG. 3C. In some implementations, the ranking and predicting processes described above may be performed at an earlier phase of the method 500, e.g., when a previous echo reference was being evaluated. In some examples, the ranking and predicting processes described above may be performed before the method 500 is performed. In some implementations wherein the ranking and predicting processes described above have been previously performed, block 502 may simply involve selecting the highest-ranking unselected echo reference as determined by such a previous process.

In this example, block 503 involves comparing the performance and cost of adding the echo reference selected in block 502. In some examples wherein the process of block 503 is performed by the echo reference orchestrator 302A, block 503 may be based, at least in part, on information 422A from the cost estimation module 403A indicating the cost(s) of including an echo reference in the set of echo references 313A.

Because performance and cost may be variables having different ranges and/or domains, it may be challenging to compare these variables directly. Therefore, in some implementations the evaluation of block 503 may be facilitated by mapping the performance and cost may be variables to a similar scale, such as a range between predefined minimum and maximum values.

In some implementations, the cost of adding the echo reference being evaluated may simply be set to zero if adding the echo reference would not cause a predetermined network bandwidth and/or computational cost budget to be exceeded. In some such examples, the cost of adding the echo reference being evaluated may be set to be infinite if adding the echo reference would cause a predetermined network bandwidth and/or computational cost budget to be exceeded. Such examples have the benefits of simplicity and efficiency. In this manner, the control system may simply add the maximum number of echo references that the predetermined network bandwidth and/or computational cost budget will allow.

According to some examples, the estimated performance increase corresponding with adding an echo reference may be set to zero if the estimated performance increase is not above a predetermined threshold (e.g., 1%, 2%, 3%, 4%, 5%, 6%, 7%, 8%, 9%, 10%, etc.). Such methods can prevent the consumption of network bandwidth and/or computational overhead by including echo references that only add insignificant performance increases. Some detailed alternative examples of cost determination are described below.

In this example, block 504 involves determining whether or not the new echo reference will be added, given the performance/cost evaluation of block 503. In some examples, blocks 503 and 504 may be combined into a single block. According to this example, block 504 involves determining whether the cost of adding the echo reference being evaluated would be less than the EMS performance increase that is estimated to be caused by adding the echo reference. In this example, if the estimated cost would not be less than the estimated performance increase, the process continues to block 511 and method 500 terminates. However, in this implementation, if the estimated cost would be less than the estimated performance increase, the process continues to block 505.

According to this example, block 505 involves adding the new echo reference to the set of selected echo references. In some instances, block 505 may include informing the renderer 202 to output the relevant echo reference. According to some examples, block 505 may involve sending the echo reference over the local network or sending a command 311 to another device to send the echo reference over the local network.

The echo references evaluated in method 500 may be either local or non-local echo references, the latter of which may be determined locally (e.g., by a local renderer as described above) or received over a local network. Accordingly, the cost estimation for some echo references may involve evaluating both computational and network costs.

According to some examples, to evaluate the next echo reference after block 505, the control system may simply reset the selected and unselected echo references and revert to a previous block of FIG. 5A, such as block 501, block 502 or block 503. However, more elaborate methods also may involve evaluating references that have already been chosen, e.g., ranking all of the references that have already been chosen and deciding whether or not to drop the echo reference with the lowest estimated importance.

Alternative Echo Reference Forms

An echo reference may be transmitted (or used locally within a device, such as a device that produces all of the echo references) in a number of forms or variants, which may alter the cost/benefit ratio of that particular echo reference. For example, it is possible to reduce the cost of sending an echo reference across the local network if we transform the echo reference into a banded power form (in other words, determining the power in each of a plurality of frequency bands and transmitting banded power information about the power in each frequency band). However, the potential improvement that could be obtained by an EMS using a lower-fidelity variant of an echo reference will generally also be lower. The choice to make any particular variant of the echo reference available can be accounted for by making it a potential candidate for selection.

In some implementations, an echo reference may be in one of the following forms, which are listed below (the first four of which are in an estimated order of decreasing performance):

A full-fidelity (original, exact) echo reference, which will incur full computational and network (if transported over the network) costs A downsampled echo reference, for which computational and network costs will be proportionately decreased according to the downsampling factor, but which will incur a computational cost for the downsampling process;

An encoded echo reference produced via a lossy encoding process, for which network cost may be decreased according to the compression ratio of the encoding scheme, but which will incur both encoding and decoding computational costs;

Banded power information corresponding to an echo reference, for which network cost may be decreased significantly because the number of bands may be much lower than the number of subbands of the full-fidelity echo reference and for which the computational cost may be decreased significantly because the cost of implementing a banded AES is much less than the cost of implementing a subband AEC; or Any other form wherein fidelity is reduced in return for some decrease in cost whether that be computational, network or something else, e.g. memory.

Figure 5B:
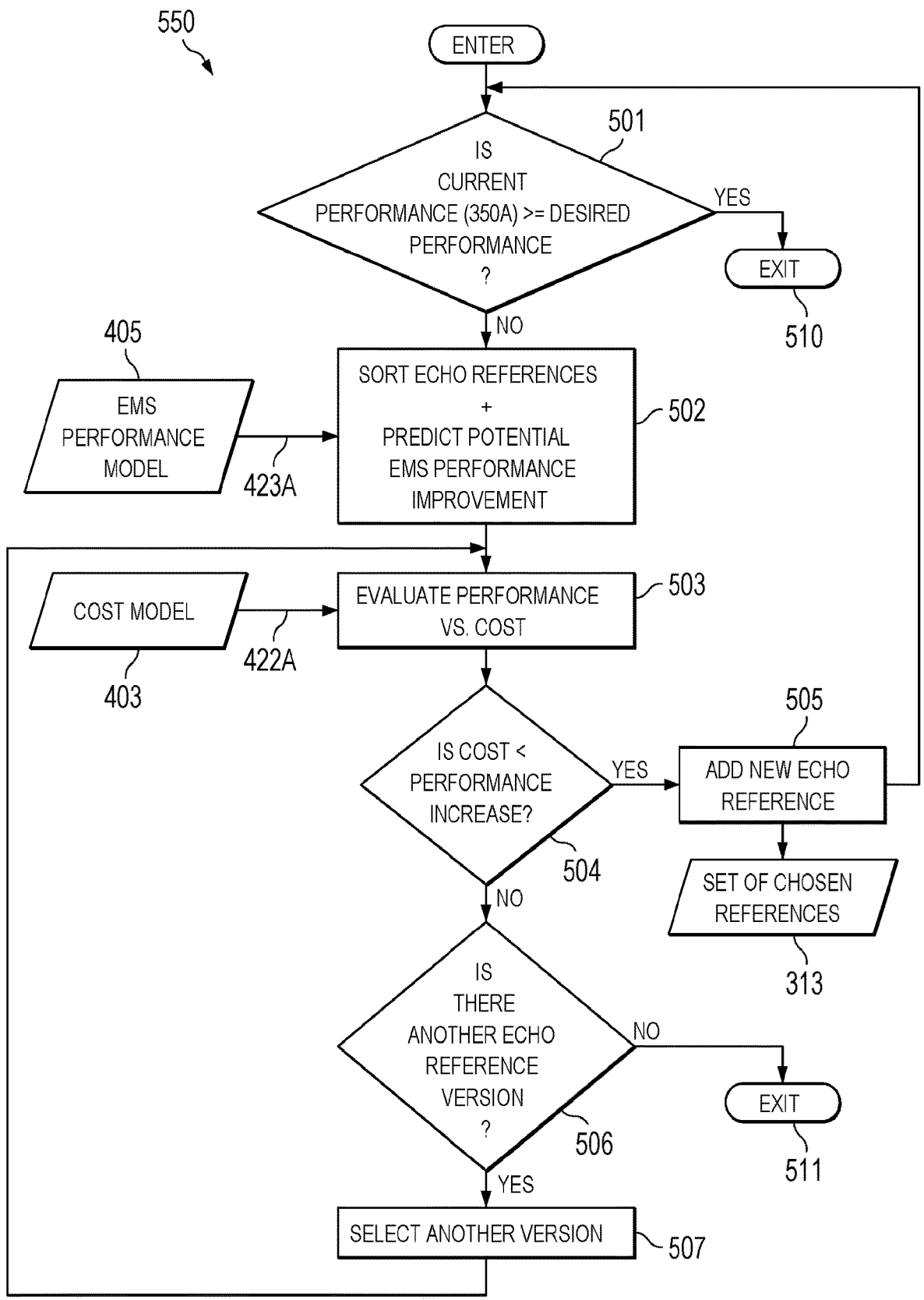
FIG. 5B is a flow diagram that outlines another example of a disclosed method.

FIG. 5B is a flow diagram that outlines another example of a disclosed method. The blocks of method 550, like other methods described herein, are not necessarily performed in the order indicated. In some examples, one or more blocks may be performed concurrently. Moreover, such methods may include more or fewer blocks than shown and/or described.

The blocks of method 550 may, for example, be performed by a control system, such as the control system 60a of FIG. 2A or FIG. 3A. In some examples, the blocks of method 550 may be performed by an echo reference selector module, such as the echo reference selector 402A that is described above with reference to FIG. 4.

Method 550 takes into account the fact that echo references may not necessarily be transmitted or used in a full-fidelity form, but instead may be in one of the above-described alternative partial-fidelity forms. Therefore, in method 550 the evaluation of performance and cost does not involve a binary decision as to whether an echo reference in a full-fidelity form will or will not be used. Instead, method 550 involves determining whether to include one or more lower-fidelity versions of an echo reference, which may involve and potentially less of an increase in EMS performance, but at a lower cost. Methods such as method 550 provide additional flexibility in the potential set of echo references to be used by the echo management system.

In this example, method 550 is an extension of the echo reference selection method 500 that is described above with reference to FIG. 5A. Accordingly, blocks 501 (if included), 502, 503, 504 and 505 may be performed as above with reference to FIG. 5A, unless noted to the contrary below.

Method 550 adds the potentially iterative loop that includes blocks 506 and 507 to method 500. According to this example, if it is determined (here, in block 504) that the estimated cost of adding one version of an echo reference will not be less than the estimated EMS performance increase, it is determined in block 506 whether there is another version of the echo reference. In some examples, a full-fidelity version of the echo reference may be evaluated before a lower-fidelity version (if any are available). According to this implementation, if it is determined in block 506 that another version of the echo reference is available, another version of the echo reference (e.g., the highest-fidelity version that is not the full-fidelity version) will be selected in block 507 and evaluated in block 503.

Accordingly, method 550 involves evaluating lower-fidelity versions of an echo reference, if any are available. Such lower-fidelity versions may include a downsampled version of the echo reference, an encoded version of the echo reference produced via a lossy encoding process and/or banded power information corresponding to the echo reference.

Cost Models

The "cost" of an echo reference refers to the resources required to utilize the reference for the purposes of echo management, whether that be with an AEC or an AES. Some disclosed implementations may involve estimating one or more of the following types of costs:

Computational cost, which may be determined with reference to the use of a limited amount of processing power available on one or more of the devices in an audio environment. Computational cost may refer to one or more of the following:

The cost required to perform echo management on a particular listening device using the reference. This may refer to the use of the reference in an AEC or an AES. One will note that an AEC operates on bins or subbands (which are complex numbers) and requires significantly more CPU operations than an AES, which operates on bands (of which there are a fewer number of compared to the bins/subbands used by an AES and the band powers are real numbers, not complex numbers);

The cost required to encode or decode the echo reference if coded references are being used;

The cost required to band a signal (in other words, transforming the signal from a simple linear frequency domain representation to a banded frequency domain representation); and/or The cost required to produce the echo reference (e.g., by a renderer).

Network cost, which refers to the use of a limited amount of network resources such as the bandwidth available in the local network (e.g., the local wireless network in the audio environment) used for sharing echo references amongst devices.

The total cost of a particular set of echo references may be determined as the sum of the cost of each echo reference in the set. Some disclosed examples involve combining both the network and computational costs. According to some examples, the total cost $C_{total}$ may be determined as follows:

$$C_{total} = \max\left(\frac{1}{R_{comp}}\sum_m^M C_m^{comp}, \frac{1}{R_{network}}\sum_m^M C_m^{network}\right)$$

In the foregoing equation, $R_{comp}$ represents the total amount of computational resources available for the purposes of echo management, $R_{network}$ represents the total amount of network resources available for the purposes of echo management; $C_m^{comp}$ represents the computational cost associated with using the $m^{th}$ reference and $C_m^{network}$ represents the network cost associated with using the $m^{th}$ reference (where there are a total of M references used in the EMS). One may note that this definition implies that $$0 \leq C_{total} \leq 1,$$

and that $C_{total}$ includes only the cost components that are closest to becoming bounded by the resources available to the system.

Performance

The "performance" of an echo management system (EMS) may refer to the following:

The amount of echo that is removed from the microphone feed, which may be measured in echo return loss enhancement (ERLE), which is measured in decibels and is the ratio of send-in power to the power of a residual error signal. This metric can be normalized, e.g., according to an application-based metric such as the minimal ERLE required in order to support and Automatic Speech Recognition (ASR) processor performing a wakeword detection task wherein a particular keyword uttered in the presence of echo is detected;

The robustness of the EMS when perturbed by room noise sources, non-linearities in the local audio system, doubletalk, etc.;

The robustness of the EMS when using less than full-fidelity echo references;

The ability of the EMS to track changes in the system, including the ability of the EMS to converge initially; and/or The ability of the EMS to track changes in the rendered audio scene. For example, this may refer to shifts in an echo reference covariance matrix and the robustness of the EMS to a non-stationary non-uniqueness problem.

Some examples may involve determining a single performance metric P. Some such examples use the ERLE and the robustness estimated from adaptive filter coefficient data or other AEC statistics obtained from the EMS. According to some such examples, a performance robustness metric $P_{rob}$ may be determined using the "microphone probability" extracted from an AEC, e.g., as follows:

$$P_{Rob} = 1 - M\_prob$$

In the foregoing equation, $0 \leq P_{Rob} \leq 1$, $0 \leq M\_prob \leq 1$ and M_prob represents the microphone probability, which is the proportion of the number of subband adaptive filters in the AEC that produce poor echo predictions that do not provide substantial (or any) echo cancellation in their respective subband.

The performance of a wakeword (WW) detector is strongly dependent on the speech to echo ratio (SER), which proportionately improved by the ERLE of the EMS. When the SER is too low, the WW detector is more likely to both trigger falsely (a false alarm) and miss keywords uttered by the user (a missed detection) due to the echo corrupting the microphone signal and decreasing the accuracy of the system. The SER of the residual signal (e.g., the residual signal 224A of FIG. 2A) which is consumed by the ASR processor (e.g., speech processing block 240A of FIG. 2A) is improved by the EMS proportionally to the ERLE of the EMS, thereby improving the performance of the WW detector.

Accordingly, some disclosed examples involve mapping a desired WW performance level to a nominal SER level which in turn, in conjunction with knowledge of the typical playback levels of the devices in a system, allows a control system to map this a desired WW performance level to a nominal ERLE directly. In some examples, this method may be extended to map the WW performance of a system at various SER levels to the ERLE. In some such implementations, the receiver operating characteristic (ROC) curve of a particular WW detector can be produced using input data with a range of SER values. Some examples involve choosing a particular False alarm rate (FAR) of interest and taking the accuracy of the WW detector as a function of the SER for this particular FAR as our application basis. In some such examples, $$A_{CC}(SER_{res}) = ROC(SER_{res}, FAR_I)$$

In the foregoing equation, $A_{CC}(SER_{res})$ represents the accuracy of the WW detector as a function of the $SER_{res}$ which represents the SER of the residual signal output by the EMS. ROC( ) represents a collection of ROC curves for multiple SERs and $FAR_I$ represents the False alarm rate of interest, of which typical values may be 3 per 24 hours and 1 per 10 hours. The accuracy $A_{CC}(SER_{res})$ may be represented as a percentage or normalized such that it is in the range from 0 to 1, which may be expressed as follows:

$$0 \leq Acc(SER_{res}) \leq 1$$

With knowledge of the playback capability of the audio devices in the audio environment, using LUPA components for, e.g., the actual echo level and speech levels typical of the target audio environments can be combined to determine typical SER values in the microphone signal (e.g., microphone signal 223A of FIG. 2A), e.g., as follows:

$$SER_{mic} = \frac{Speech\_pwr}{Echo\_pwr}$$

In the foregoing equation, Speech_pwr and Echo_pwr represent the expected baseline speech power level and the echo power level of the targeted audio environment, respectively. By way of the EMS, the $SER_{mic}$ can improved to $SER_{res}$ proportionately to the ERLE, e.g., as follows:

$$SER_{res}^{dB} = SER_{mic}^{dB} + ERLE^{dB}$$

In the foregoing equation, the superscript dB indicates that the variables are represented in decibels in this example. For completeness, some implementations may define the ERLE of the EMS as follows:

$$ERLE^{dB} = 10\log_{10}\left(\frac{mic\_echo\_pwr}{residual\_echo\_pwr}\right)$$

Using the foregoing equations, some implementations may define a WW application based EMS performance metric as follows:

$$P_{WW} = Acc(SER_{mic}^{dB} + ERLE^{dB}),$$

where $SER_{mic}^{dB}$ is representative of the SER in the target environment. In some examples $SER_{mic}^{dB}$ may be a static default number, whereas in other examples $SER_{mic}^{dB}$ may be estimated, e.g., as a function of one or more LUPA components. Some implementations may involve defining a net performance metric P as a vector containing each element, e.g., as follows:

$$P = [P_{WW}, P_{Rob}]$$

In some examples, one or more additional performance components may be added by increasing the size of the net performance vector. In some alternative examples, one or more additional performance components may be combined into a single scalar metric by weighting them, e.g., as follows:

$$P = (1 - K)P_{WW} + KP_{Rob}$$

In the foregoing equation, K represents a weighting factor, chosen by the system designer, which is used to determine how much of each component contributes to the net performance. Some alternative examples may use another method, e.g., simply averaging individual performance metrics. However, it may be advantageous to combine the individual performance metrics into a single scalar one.

Trading Cost and Performance

When comparing the estimated cost and the estimated EMS performance enhancement for an echo reference, a method needs to somehow compare these two parameters which will not normally be in the same domain. One such method involves evaluating the cost and performance estimates individually and taking the lowest-cost solution that meets a predefined minimum performance criterion, $P_{min}$. This predefined EMS performance criterion may, for example, be determined according to the requirements of a specific downstream application (e.g., providing a telephone call, music playback, awaiting a WW, etc.).

For example, in an implementation in which the application is WW detection, the performance may relate to a WW performance metric $P_{WW}$. In some such examples, there may be some minimum level of WW detector accuracy that is deemed sufficient (e.g., an 80% level of WW detector accuracy, an 85% level of WW detector accuracy, a 90% level of WW detector accuracy, a 95% level of WW detector accuracy, etc.), which would have a corresponding $ERLE^{dB}$ as per the previous section. In some such examples, the ERLE of the EMS may be estimated using the EMS performance model (e.g., the MC-EMS performance model 405 of FIG. 4). Thus, such implementations do not need to trade cost and performance off directly if the goal is simply to find the lowest-cost solution (e.g., in terms of total cost $C_{total}$).

As an alternative to meeting some minimum performance metric, some implementations may involve using both a performance metric P and a cost metric C. Some such examples, may involve using a tradeoff parameter λ (e.g., a Lagrange multiplier), and formulate the cost/performance evaluation process as an optimization problem which seeks to maximize a quantity, such as the variable F in the following expression:

$$F = P - \lambda C_{total}$$

One may observe that in the foregoing equation, a relatively larger value of F corresponds with a relatively larger difference between the performance metric P and product of λ and the total cost $C_{total}$. The tradeoff parameter λ may be chosen (e.g., by the system designer) in order to directly trade off cost and performance. The solution for the set of echo references used by the EMS may then be found using an optimization algorithm wherein a set of echo references (which may include all available echo reference fidelity levels) determines the search space.

Figure 6:
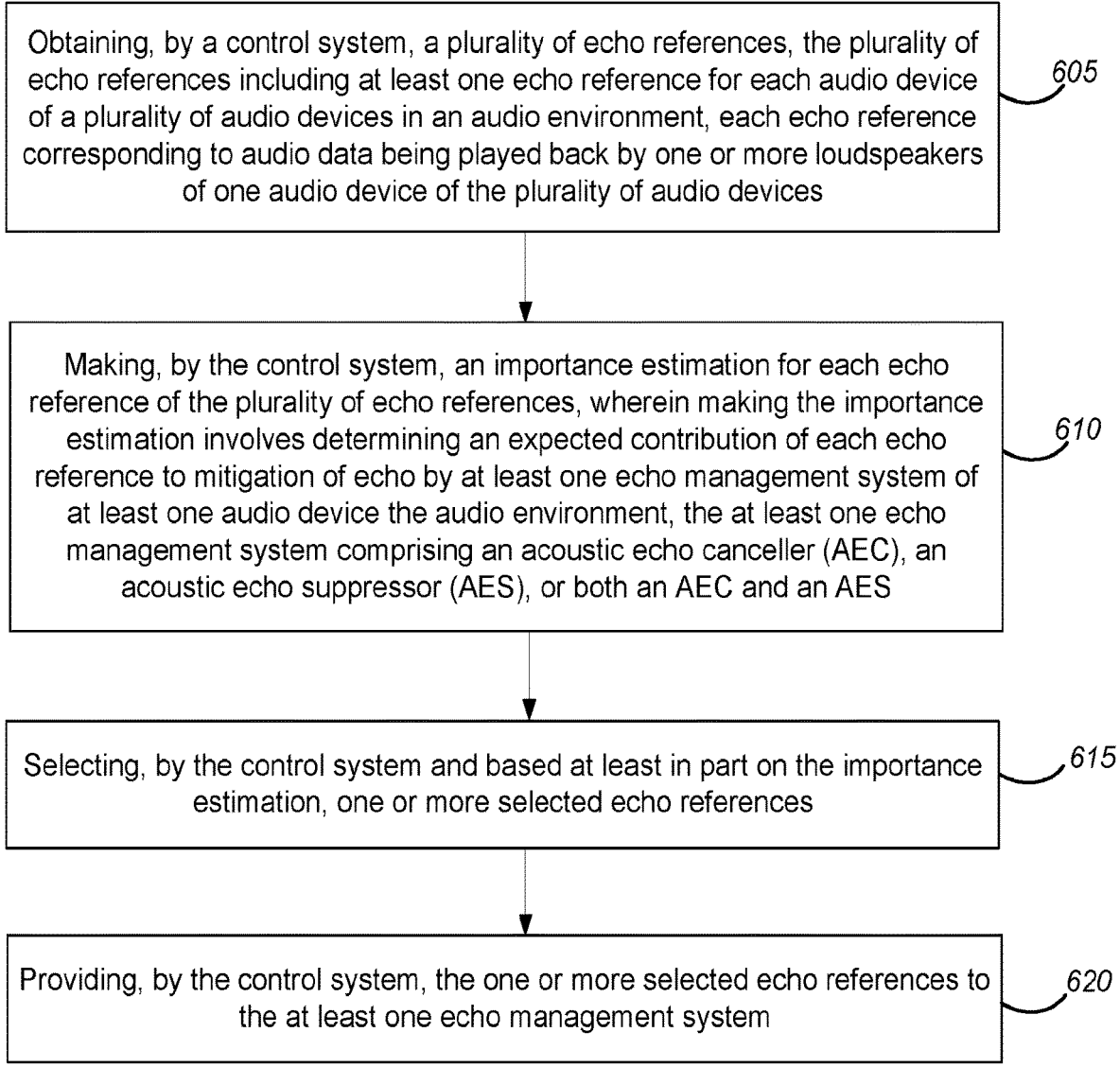
FIG. 6 is a flow diagram that outlines one example of a disclosed method.

FIG. 6 is a flow diagram that outlines one example of a disclosed method. The blocks of method 600, like other methods described herein, are not necessarily performed in the order indicated. Moreover, such methods may include more or fewer blocks than shown and/or described. In some examples, two or more blocks may be performed concurrently. In this example, method 600 is an audio processing method.

The method 600 may be performed by an apparatus or system, such as the apparatus 50 that is shown in FIG. 1A and described above. In some examples, the blocks of method 600 may be performed by one or more devices within an audio environment, e.g., by an audio system controller (such as what is referred to herein as a smart home hub) or by another component of an audio system, such as a smart speaker, a television, a television control module, a laptop computer, a mobile device (such as a cellular telephone), etc. In some implementations, the audio environment may include one or more rooms of a home environment. In other examples, the audio environment may be another type of environment, such as an office environment, an automobile environment, a train environment, a street or sidewalk environment, a park environment, etc. However, in alternative implementations at least some blocks of the method 600 may be performed by a device that implements a cloud-based service, such as a server.

In this implementation, block 605 involves obtaining, by a control system, a plurality of echo references. In this example, the plurality of echo references includes at least one echo reference for each audio device of a plurality of audio devices in an audio environment. Here, each echo reference corresponds to audio data being played back by one or more loudspeakers of one audio device of the plurality of audio devices.

In this example, block 610 involves making, by the control system, an importance estimation for each echo reference of the plurality of echo references. According to this example, making the importance estimation involves determining an expected contribution of each echo reference to mitigation of echo by at least one echo management system of at least one audio device of the audio environment. In this example, the at least one echo management system includes an acoustic echo canceller (AEC) and/or an acoustic echo suppressor (AES).

In this implementation, block 615 involves selecting, by the control system and based at least in part on the importance estimation, one or more selected echo references. In this example, block 620 involves providing, by the control system, the one or more selected echo references to the at least one echo management system. In some implementations, method 600 may involve causing the at least one echo management system to cancel or suppress echoes based, at least in part, on the one or more selected echo references.

In some examples, obtaining the plurality of echo references may involve receiving a content stream that includes audio data and determining one or more echo references of the plurality of echo references based on the audio data. Some examples are described above with reference to the renderer 201A of FIG. 2A.

In some implementations, the control system may include an audio device control system of an audio device of the plurality of audio devices in the audio environment. In some such examples, the method may involve rendering, by the audio device control system, the audio data for reproduction on the audio device to produce local speaker feed signals. In some such examples, the method may involve determining a local echo reference that corresponds with the local speaker feed signals.

In some examples, obtaining the plurality of echo references may involve determining one or more non-local echo references based on the audio data. Each of the non-local echo references may, for example, correspond to non-local speaker feed signals for playback on another audio device of the audio environment.

According to some examples, obtaining the plurality of echo references may involve receiving one or more non-local echo references. Each of the non-local echo references may, for example, correspond to non-local speaker feed signals for playback on another audio device of the audio environment. In some examples, receiving the one or more non-local echo references may involve receiving the one or more non-local echo references from one or more other audio devices of the audio environment. In some examples, receiving the one or more non-local echo references may involve receiving each of the one or more non-local echo references from a single other device of the audio environment.

In some examples, the method may involve a cost determination. According to some such examples, the cost determination may involve determining a cost for at least one echo reference of the plurality of echo references. In some such examples selecting the one or more selected echo references may be based, at least in part, on the cost determination. According to some such examples, the cost determination may be based, at least in part, on the network bandwidth required for transmitting the at least one echo reference, an encoding computational requirement for encoding the at least one echo reference, a decoding computational requirement for decoding the at least one echo reference, an echo management system computational requirement for use of the at least one echo reference by the echo management system, or one or more combinations thereof. In some examples, the cost determination may be based, at least in part, on a full-fidelity replica of the at least one echo reference in a time domain or a frequency domain, on a downsampled version of the at least one echo reference, on a lossy compression of the at least one echo reference, on banded power information for the at least one echo reference, or one or more combinations thereof. In some examples, the cost determination may be based, at least in part, on a method of compressing a relatively more important echo reference less than a relatively less important echo reference.

According to some examples, the method may involve determining a current echo management system performance level. In some such examples, selecting the one or more selected echo references may be based, at least in part, on the current echo management system performance level.

In some examples, making the importance estimation may involve determining an importance metric for a corresponding echo reference. In some examples, determining the importance metric may involve determining a level of the corresponding echo reference, determining a uniqueness of the corresponding echo reference, determining a temporal persistence of the corresponding echo reference, determining an audibility of the corresponding echo reference, or one or more combinations thereof. According to some examples, determining the importance metric may be based, at least in part, on metadata corresponding to an audio device layout, loudspeaker metadata, metadata corresponding to received audio data, an upmixing matrix, a matrix of loudspeaker activations, or one or more combinations thereof. In some examples, determining the importance metric may be based, at least in part, on a current listening objective, a current ambient noise estimate, an estimate of a current performance of the at least one echo management system, or one or more combinations thereof.

FIG. 7 shows an example of a floor plan of an audio environment, which is a living space in this example. As with other figures provided herein, the types and numbers of elements shown in FIG. 7 are merely provided by way of example. Other implementations may include more, fewer and/or different types and numbers of elements.

According to this example, the environment 700 includes a living room 710 at the upper left, a kitchen 715 at the lower center, and a bedroom 722 at the lower right. Boxes and circles distributed across the living space represent a set of loudspeakers 705a-705h, at least some of which may be smart speakers in some implementations, placed in locations convenient to the space, but not adhering to any standard prescribed layout (arbitrarily placed). In some examples, the television 730 may be configured to implement one or more disclosed embodiments, at least in part. In this example, the environment 700 includes cameras 711a-711e, which are distributed throughout the environment. In some implementations, one or more smart audio devices in the environment 700 also may include one or more cameras. The one or more smart audio devices may be single purpose audio devices or virtual assistants. In some examples, one or more cameras of the optional sensor system 130 may reside in or on the television 730, in a mobile phone or in a smart speaker, such as one or more of the loudspeakers 705b, 705d, 705e or 705h. Although cameras 711a-711e are not shown in every depiction of the audio environments presented in this disclosure, each of the audio environments may nonetheless include one or more cameras in some implementations.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

Various aspects of the present invention may be appreciated from the following enumerated example embodiments (EEEs):

1. An audio processing method, comprising:
    obtaining, by a control system, a plurality of echo references, the plurality of echo references including at least one echo reference for each audio device of a plurality of audio devices in an audio environment, each echo reference corresponding to audio data being played back by one or more loudspeakers of one audio device of the plurality of audio devices;
    making, by the control system, an importance estimation for each echo reference of the plurality of echo references, wherein making the importance estimation involves determining an expected contribution of each echo reference to mitigation of echo by at least one echo management system of at least one audio device of the audio environment, the at least one echo management system comprising an acoustic echo canceller (AEC), an acoustic echo suppressor (AES), or both an AEC and an AES;
    selecting, by the control system and based at least in part on the importance estimation, one or more selected echo references; and providing, by the control system, the one or more selected echo references to the at least one echo management system.

2. The audio processing method of EEE 1, further comprising causing the at least one echo management system to cancel or suppress echoes based, at least in part, on the one or more selected echo references.

3. The audio processing method of EEE 1 or EEE 2, wherein obtaining the plurality of echo references involves:
    receiving a content stream that includes audio data; and
    determining one or more echo references of the plurality of echo references based on the audio data.

4. The audio processing method of EEE 3, wherein the control system comprises an audio device control system of an audio device of the plurality of audio devices in the audio environment, further comprising:
    rendering, by the audio device control system, the audio data for reproduction on the audio device to produce local speaker feed signals; and
    determining a local echo reference that corresponds with the local speaker feed signals.

5. The audio processing method of EEE 4, wherein obtaining the plurality of echo references involves determining one or more non-local echo references based on the audio data, each of the non-local echo references corresponding to non-local speaker feed signals for playback on another audio device of the audio environment.

6. The audio processing method of EEE 4, wherein obtaining the plurality of echo references involves receiving one or more non-local echo references, each of the non-local echo references corresponding to non-local speaker feed signals for playback on another audio device of the audio environment.

7. The audio processing method of EEE 6, wherein receiving the one or more non-local echo references involves receiving the one or more non-local echo references from one or more other audio devices of the audio environment.

8. The audio processing method of EEE 6, wherein receiving the one or more non-local echo references involves receiving each of the one or more non-local echo references from a single other device of the audio environment.

9. The audio processing method of any one of EEEs 1-8, further comprising a cost determination, the cost determination involving determining a cost for at least one echo reference of the plurality of echo references, wherein selecting the one or more selected echo references is based, at least in part, on the cost determination.

10. The audio processing method of EEE 9, wherein the cost determination is based on network bandwidth required for transmitting the at least one echo reference, an encoding computational requirement for encoding the at least one echo reference, a decoding computational requirement for decoding the at least one echo reference, an echo management system computational requirement for use of the at least one echo reference by the echo management system, or combinations thereof.

11. The audio processing method of EEE 9 or EEE 10, wherein the cost determination is based on a replica of the at least one echo reference in a time domain or a frequency domain, on a downsampled version of the at least one echo reference, on a lossy compression of the at least one echo reference, on banded power information for the at least one echo reference, or combinations thereof.

12. The audio processing method of any one of EEEs 9-11, wherein the cost determination is based on a method of compressing a relatively more important echo reference less than a relatively less important echo reference.

13. The audio processing method of any one of EEEs 1-12, further comprising determining a current echo management system performance level, wherein selecting the one or more selected echo references is based, at least in part, on the current echo management system performance level.

14. The audio processing method of any one of EEEs 1-13, wherein making the importance estimation involves determining an importance metric for a corresponding echo reference.

15. The audio processing method of EEE 14, wherein determining the importance metric involves determining a level of the corresponding echo reference, determining a uniqueness of the corresponding echo reference, determining a temporal persistence of the corresponding echo reference, determining an audibility of the corresponding echo reference, or combinations thereof.

16. The audio processing method of EEE 14 or EEE 15, wherein determining the importance metric is based at least in part on metadata corresponding to an audio device layout, loudspeaker metadata, metadata corresponding to received audio data, an upmixing matrix, a matrix of loudspeaker activations, or combinations thereof.

17. The audio processing method of any one of EEEs 14-16, wherein determining the importance metric is based at least in part on a current listening objective, a current ambient noise estimate, an estimate of a current performance of the at least one echo management system, or combinations thereof.

18. An apparatus configured to perform the method of any one of EEEs 1-17.

19. A system configured to perform the method of any one of EEEs 1-17.

20. One or more non-transitory media having software stored thereon, the software including instructions for controlling one or more devices to perform the method of any one of EEEs 1-17.

The invention claimed is:

1. An audio processing method for managing echo by a first audio device of a plurality of audio devices of an audio system, wherein each audio device of the plurality of audio devices comprises one or more loudspeakers, wherein the first audio device further comprises a control system, wherein the control system comprises an echo management system comprising an acoustic echo canceller (AEC), an acoustic echo suppressor (AES), or both an AEC and an AES, the method comprising:
obtaining, by the control system of the first audio device, a plurality of echo references, the plurality of echo references including at least one echo reference for each audio device of the plurality of audio devices, each echo reference corresponding to audio data being played back by the one or more loudspeakers of the corresponding audio device;
making, by the control system, an importance estimation for each echo reference of the plurality of echo references, wherein making the importance estimation involves determining, by the echo management system of the first audio device, a measure of an expected improvement in performance of the echo management system in suppressing or cancelling echoes due to the inclusion of each particular echo reference;
selecting, by the control system and based at least in part on the importance estimation, one or more echo references from the plurality of echo references;
providing, by the control system, the one or more selected echo references to the echo management system; and
suppressing or cancelling, by the echo management system of the first audio device, echoes based at least in part on the one or more selected echo references.

2. The audio processing method of claim 1, wherein obtaining the plurality of echo references involves:
receiving a content stream that includes audio data; and
determining one or more echo references of the plurality of echo references based on the audio data.

3. The audio processing method of claim 2, further comprising:
rendering, by the control system, the audio data for reproduction on the first audio device to produce local speaker feed signals; and
determining a local echo reference that corresponds with the local speaker feed signals.

4. The audio processing method of claim 3, wherein obtaining the plurality of echo references involves determining one or more non-local echo references based on the audio data, each of the non-local echo references corresponding to non-local speaker feed signals for playback on another audio device of the audio environment.

5. The audio processing method of claim 3, wherein obtaining the plurality of echo references involves receiving one or more non-local echo references, each of the non-local echo references corresponding to non-local speaker feed signals for playback on another audio device of the audio environment.

6. The audio processing method of claim 5, wherein receiving the one or more non-local echo references involves receiving the one or more non-local echo references from one or more other audio devices of the audio environment.

7. The audio processing method of claim 5, wherein receiving the one or more non-local echo references involves receiving each of the one or more non-local echo references from a single other device of the audio environment.

8. The audio processing method of claim 1, further comprising a cost determination, the cost determination involving determining a cost for at least one echo reference of the plurality of echo references, wherein selecting the one or more selected echo references is based, at least in part, on the cost determination.

9. The audio processing method of claim 8, wherein the cost determination is based on network bandwidth required for transmitting the at least one echo reference, an encoding computational requirement for encoding the at least one echo reference, a decoding computational requirement for decoding the at least one echo reference, an echo management system computational requirement for use of the at least one echo reference by the echo management system, or combinations thereof.

10. The audio processing method of claim 8, wherein the cost determination is based on a replica of the at least one echo reference in a time domain or a frequency domain, on a downsampled version of the at least one echo reference, on a lossy compression of the at least one echo reference, on banded power information for the at least one echo reference, on a method of compressing a relatively more important echo reference less than a relatively less important echo reference, or combinations thereof.

11. The audio processing method of claim 8, wherein the cost determination is based on a method of compressing a relatively more important echo reference less than a relatively less important echo reference.

12. The audio processing method of claim 1, further comprising determining a current echo management system performance level, wherein selecting the one or more selected echo references is based, at least in part, on the current echo management system performance level.

13. The audio processing method of claim 1, wherein making the importance estimation involves determining an importance metric for a corresponding echo reference.

14. The audio processing method of claim 13, wherein determining the importance metric is based at least in part on a level of the corresponding echo reference, a uniqueness of the corresponding echo reference, a temporal persistence of the corresponding echo reference, an audibility of the corresponding echo reference or combinations thereof.

15. The audio processing method of claim 13, wherein determining the importance metric is based at least in part on metadata corresponding to an audio device layout, loudspeaker metadata, metadata corresponding to received audio data, an upmixing matrix, a matrix of loudspeaker activations, or combinations thereof.

16. The audio processing method of claim 13, wherein determining the importance metric is based at least in part on a current listening objective, a current ambient noise estimate, an estimate of a current performance of the echo management system, or combinations thereof.

17. The audio processing method of any of the previous claims, wherein the audio devices of the audio system are communicatively coupled via a wired or wireless communication network, and wherein the plurality of echo references is obtained via the wired or wireless communication network.

18. An apparatus including a processor configured to make the apparatus perform the method of claim 1.

19. A system including a processor configured to make the system perform the method of claim 1.

20. One or more non-transitory media having software stored thereon, the software including instructions for controlling one or more devices to perform the method of claim 1.

* * * * *